(12) United States Patent
Ihara

(10) Patent No.: US 7,218,407 B1
(45) Date of Patent: May 15, 2007

(54) IMAGE PRINTING SYSTEM

(75) Inventor: Yushi Ihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 834 days.

(21) Appl. No.: 09/831,694

(22) PCT Filed: Sep. 11, 2000

(86) PCT No.: PCT/JP00/06198

§ 371 (c)(1),
(2), (4) Date: Jul. 19, 2001

(87) PCT Pub. No.: WO01/20896

PCT Pub. Date: Mar. 22, 2001

(30) Foreign Application Priority Data

Sep. 14, 1999 (JP) ............................. 11-261279

(51) Int. Cl.
*G06F 15/00* (2006.01)
(52) U.S. Cl. .................................... 358/1.15
(58) Field of Classification Search .............. 358/1.15, 358/1.18, 1.2; 355/40; 400/61, 62; 710/5, 710/8, 106; 711/203; 370/229
See application file for complete search history.

(56) References Cited

U.S. PATENT DOCUMENTS

| | | | | |
|---|---|---|---|---|
| 6,092,171 A | * | 7/2000 | Relph | 711/203 |
| 6,313,919 B1 | * | 11/2001 | Nakagiri et al. | 358/1.11 |
| 6,411,400 B1 | * | 6/2002 | Mori | 358/1.2 |
| 6,603,737 B1 | * | 8/2003 | Fukunaga et al. | 370/229 |
| 6,833,930 B2 | * | 12/2004 | Nishikawa et al. | 358/1.2 |
| 2005/0052662 A1 | * | 3/2005 | Nishikawa et al. | 358/1.2 |

FOREIGN PATENT DOCUMENTS

| | | |
|---|---|---|
| JP | 7-271773 | 10/1995 |
| JP | 8-172521 | 7/1996 |
| JP | 10-13659 | 1/1998 |
| JP | 10-226139 | 8/1998 |
| JP | 10-229490 | 8/1998 |
| JP | 11-70717 | 3/1999 |
| JP | 11-110160 | 4/1999 |
| JP | 11-221944 | 8/1999 |

* cited by examiner

*Primary Examiner*—King Y. Poon
*Assistant Examiner*—Saeid Ebrahimi
(74) *Attorney, Agent, or Firm*—Frommer Lawrence & Haug LLP; William S. Frommer; Thomas F. Presson

(57) ABSTRACT

A capture command in the AV/C protocol of the IEEE 1394 standard is set as follows.

The quantity of data to be transmitted (data_size), the number of pixels in the X-direction (image_size_x) and the number of pixels in the Y-direction (image_size_y) are all set to 0. The image type (image_format_specifier) is set to "Don't Care".

A printer device, having received such a capture command, makes a blank in the corresponding print area without printing the image and then prints the next image.

2 Claims, 49 Drawing Sheets

1 : IT IS RAINY TODAY
2 : IT WILL BE CLOUDY TOMORROW
3 : IT WAS WARM YESTERDAY
4 : X X X X X X
5 : Y Y Y Y Y Y
6 : Z Z Z Z Z Z
7 : X X X X X X
8 : Y Y Y Y Y Y
9 : Z Z Z Z Z Z
10 : X X X X X X
11 : Y Y Y Y Y Y
12 : Z Z Z Z Z Z
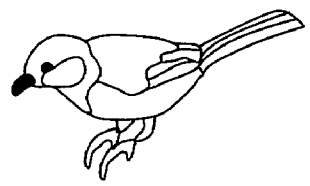
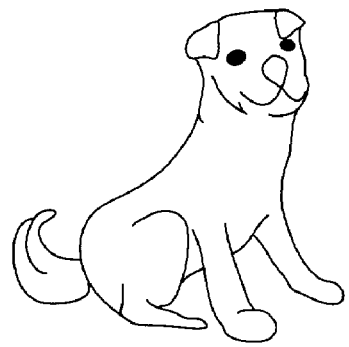
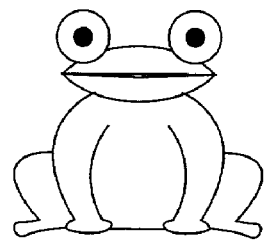
FIG.1

| | pixel_x | pixel_y | interlaced/ progressive | pixel format | screen aspect ratio | pixel aspect ratio | based standard | image size |
|---|---|---|---|---|---|---|---|---|
| 1080_422_16×9 | 1920 | 1080 | interlaced/ progressive | YCbCr 4:2:2 | 16:9 | 1:1 | ITU-R BT. 709-2 | 3.96MB |
| 1080_420_16×9 | 1920 | 1080 | interlaced/ progressive | YCbCr 4:2:0 | 16:9 | 1:1 | ITU-R BT. 709-2 | 2.97MB |
| 720_422_16×9 | 1280 | 720 | progressive | YCbCr 4:2:2 | 16:9 | 1:1 | ANSI/SMP TE 296 M-1997 | 1.76MB |
| 720_420_16×9 | 1280 | 720 | progressive | YCbCr 4:2:0 | 16:9 | 1:1 | ANSI/SMP TE 296 M-1997 | 1.32MB |
| 576_422_4×3 | 720 | 576 | interlaced/ progressive | YCbCr 4:2:2 | 4:3 | 1.07:1 | ITU-R BT.1203 | 810KB |
| 576_420_4×3 | 720 | 576 | interlaced/ progressive | YCbCr 4:2:0 | 4:3 | 1.07:1 | ITU-R BT.1203 | 608KB |
| 480_422_16×9 | 720 | 480 | interlaced/ progressive | YCbCr 4:2:2 | 16:9 | 1.91:1 | ITU-R BT. 709-2 | 675KB |
| 480_420_16×9 | 720 | 480 | interlaced/ progressive | YCbCr 4:2:0 | 16:9 | 1.91:1 | ITU-R BT. 709-2 | 506KB |
| 480_422_4×3 | 720 | 480 | interlaced/ progressive | YCbCr 4:2:2 | 4:3 | 0.89:1 | ITU-R BT.601-4 | 675KB |
| 480_420_4×3 | 720 | 480 | interlaced/ progressive | YCbCr 4:2:0 | 4:3 | 0.89:1 | ITU-R BT.601-4 | 506KB |

FIG.8

| | msb | | | | | | lsb |
|---|---|---|---|---|---|---|---|
| opcode | \multicolumn{7}{c|}{CAPTURE($42_{16}$)} |
| operand [0] | \multicolumn{7}{c|}{subfunction} |
| operand [1] | \multicolumn{5}{c|}{source_subunit_type} | \multicolumn{2}{c|}{source_subunit_ID} |
| operand [2] | \multicolumn{7}{c|}{source_plug} |
| operand [3] | \multicolumn{7}{c|}{status} |
| operand [4] | \multicolumn{7}{c|}{dest_plug} |
| operand [5] | | | | | | | |
| : | \multicolumn{7}{c|}{print_job_ID} |
| operand [16] | | | | | | | |
| operand [17] | | | | | | | |
| operand [18] | \multicolumn{7}{c|}{data_size} |
| operand [19] | | | | | | | |
| operand [20] | | | | | | | |
| operand [21] | \multicolumn{7}{c|}{image_size_x} |
| operand [22] | | | | | | | |
| operand [23] | \multicolumn{7}{c|}{image_size_y} |
| operand [24] | | | | | | | |
| operand [25] | \multicolumn{7}{c|}{image_format_specifier} |
| operand [26] | | | | | | | |
| operand [27] | | | | | | | |
| operand [28] | \multicolumn{7}{c|}{reserved} |
| operand [29] | | | | | | | |
| operand [30] | \multicolumn{7}{c|}{Next_pic} |
| operand [31] | \multicolumn{7}{c|}{Next_page} |
| operand [32] | | | | | | | |

FIG.9

| value | Type | Meaning |
|---|---|---|
| $20_{16}$ | 1080i _ 422chunky _ 16×9 | |
| $21_{16}$ | 1080p _ 422chunky _ 16×9 | |
| $22_{16}$ | 720p _ 422chunky _ 16×9 | |
| $23_{16}$ | 480I _ 422chunky _ 16×9 | |
| $24_{16}$ | 480p _ 422chunky _ 16×9 | |
| $25_{16}$ | 480I _ 422chunky _ 4×3 | |
| $26_{16}$ | 480p _ 422chunky _ 4×3 | |
| $28_{16}$ | 1080i _ 422liner _ 16×9 | |
| $29_{16}$ | 1080p _ 422liner _ 16×9 | |
| $2A_{16}$ | 720p _ 422liner _ 16×9 | |
| $2B_{16}$ | 480I _ 422liner _ 16×9 | |
| $2C_{16}$ | 480p _ 422liner _ 16×9 | |
| $2D_{16}$ | 480I _ 422liner _ 4×3 | |
| $2E_{16}$ | 480p _ 422liner _ 4×3 | |
| $30_{16}$ | 1080i _ 420planer _ 16×9 | |
| $31_{16}$ | 1080p _ 420planer _ 16×9 | |
| $32_{16}$ | 720p _ 420planer _ 16×9 | |
| $33_{16}$ | 480I _ 420planer _ 16×9 | |
| $34_{16}$ | 480p _ 420planer _ 16×9 | |
| $35_{16}$ | 480I _ 420planer _ 4×3 | |
| $36_{16}$ | 480p _ 420planer _ 4×3 | |
| $38_{16}$ | 1080i _ 420liner _ 16×9 | |
| $39_{16}$ | 1080p _ 420liner _ 16×9 | |
| $3A_{16}$ | 720p _ 420liner _ 16×9 | |
| $3B_{16}$ | 480I _ 420liner _ 16×9 | |
| $3C_{16}$ | 480p _ 420liner _ 16×9 | |
| $3D_{16}$ | 480I _ 420liner _ 4×3 | |
| $3E_{16}$ | 480p _ 420liner _ 4×3 | |
| $60_{16}$ | Text(ASCII) | MD-clip ASCII |
| $61_{16}$ | Text(ISO8859-1) | MD-clip modified ISO8859-1 |
| $62_{16}$ | Text(Music Shifted JIS) | MD-clip Music Shifted JIS |

FIG.10

| Value(MSB) | Value(LSB) | Type | Meaning |
|---|---|---|---|
| $00_{16}$ | | | |
| | $00_{16}$ | sRGB raw | sRGB raw |
| | $01_{16}$ | sRGB raw, quadlet | |
| $01_{16}$ | | | YCC raw |
| | $0X_{16}$ | YCC4:2:2 raw/chunky | |
| | $1X_{16}$ | YCC4:2:2 raw/liner | |
| | $8X_{16}$ | YCC4:2:0 raw/chunky | |
| | $9X_{16}$ | YCC4:2:0 raw/liner | |
| | $X0_{16}$ | Pixel ratio 1.00×1.00 / ITU-RBT.709-2 / interlace | |
| | $X1_{16}$ | Pixel ratio 1.19×1.00 / ITU-R BT.709-2 / interlace | |
| | $X2_{16}$ | Pixel ratio 0.89×1.00 / ITU-R BT.709-2 / interlace | |
| | $X3_{16}$ | Pixel ratio 0.89×1.00 / ITU-R BT.601-4 / interlace | |
| | $X4_{16}$ | Pixel ratio 1.07×1.00 / ITU-R BT.1203 / interlace | |
| | $X8_{16}$ | Pixel ratio 1.00×1.00 / ITU-R BT.709-2 / progressive | |
| | $X9_{16}$ | Pixel ratio 1.19×1.00 / ITU-R BT.709-2 / progressive | |
| | $XA_{16}$ | Pixel ratio 0.89×1.00 / ITU-R BT.709-2 / progressive | |
| | $XB_{16}$ | Pixel ratio 0.89×1.00 / ITU-R BT.601-4 / progressive | DCF Object |
| | $XC_{16}$ | Pixel ratio 1.07×1.00 / ITU-R BT.1203 / progressive | |
| $10_{16}$ | | | |
| | $00_{16}$ | Exif 2.1 | |
| | $01_{16}$ | JFIF | |
| | $02_{16}$ | TIFF | |
| | $0F_{16}$ | JPEG | |
| $80_{16} \sim 8F_{16}$ | $00_{16} \sim FF_{16}$ | Vendor Dependent format | |
| $FE_{16}$ | | Unit Plug defined | Special meaning |
| | $00_{16}$ | | |
| | $01_{16}$ | don't care | |

FIG.11

| $Y_1(L_1)$ | $Y_2(L_1)$ | $Cb_1(L_1)$ | $Cr_1(L_1)$ |
|---|---|---|---|
| $Y_3(L_1)$ | $Y_4(L_1)$ | $Cb_3(L_1)$ | $Cr_3(L_1)$ |
| | | ⋮ | |
| $Y_{N-1}(L_1)$ | $Y_N(L_1)$ | $Cb_{N-1}(L_1)$ | $Cr_{N-1}(L_1)$ |
| $Y_1(L_2)$ | $Y_2(L_2)$ | $Cb_1(L_2)$ | $Cr_1(L_2)$ |
| | | ⋮ | |
| $Y_{N-1}(L_M)$ | $Y_N(L_M)$ | $Cb_{N-1}(L_M)$ | $Cr_{N-1}(L_M)$ |

FIG.12

| $Y_1(L_1)$ | $Y_2(L_1)$ | $Y_1(L_2)$ | $Y_2(L_2)$ |
|---|---|---|---|
| $Cb_1(L_1)$ | $Cr_1(L_1)$ | $Y_3(L_1)$ | $Y_4(L_1)$ |
| $Y_3(L_2)$ | $Y_4(L_2)$ | $Cb_3(L_1)$ | $Cr_3(L_1)$ |
| | | ⋮ | |
| $Y_{N-3}(L_{M-1})$ | $Y_{N-2}(L_{M-1})$ | $Y_{N-3}(L_M)$ | $Y_{N-2}(L_M)$ |
| $Cb_{N-3}(L_{M-1})$ | $Cr_{N-3}(L_{M-1})$ | $Y_{N-1}(L_{M-1})$ | $Y_N(L_{M-1})$ |
| $Y_{N-1}(L_M)$ | $Y_N(L_M)$ | $Cb_{N-1}(L_{M-1})$ | $Cr_{N-1}(L_{M-1})$ |

FIG.13

| $Y_1(L_1)$ | $Y_2(L_1)$ | $Y_3(L_1)$ | $Y_4(L_1)$ |
|---|---|---|---|
| ⋮ | | | |
| $Y_{N-3}(L_1)$ | $Y_{N-2}(L_1)$ | $Y_{N-1}(L_1)$ | $Y_N(L_1)$ |
| $Cb_1(L_1)$ | $Cr_1(L_1)$ | $Cb_3(L_2)$ | $Cr_3(L_1)$ |
| ⋮ | | | |
| $Cb_{N-3}(L_M)$ | $Cr_{N-3}(L_1)$ | $Cb_{N-1}(L_1)$ | $Cr_{N-1}(L_1)$ |
| $Y_1(L_2)$ | $Y_2(L_2)$ | $Y_3(L_1)$ | $Y_4(L_1)$ |
| ⋮ | | | |
| $Cb_{N-3}(L_M)$ | $Cr_{N-3}(L_M)$ | $Cb_{N-1}(L_M)$ | $Cr_{N-1}(L_M)$ |

FIG.14

| $Y_1(L_1)$ | $Y_2(L_1)$ | $Y_3(L_1)$ | $Y_4(L_1)$ |
|---|---|---|---|
| ⋮ | | | |
| $Y_{N-3}(L_1)$ | $Y_{N-2}(L_1)$ | $Y_{N-1}(L_1)$ | $Y_N(L_1)$ |
| $Y_1(L_2)$ | $Y_2(L_2)$ | $Y_3(L_2)$ | $Y_4(L_2)$ |
| ⋮ | | | |
| $Y_{N-3}(L_2)$ | $Y_{N-2}(L_2)$ | $Y_{N-1}(L_2)$ | $Y_N(L_2)$ |
| $Cb_1(L_1)$ | $Cr_1(L_1)$ | $Cb_3(L_1)$ | $Cr_3(L_1)$ |
| ⋮ | | | |
| $Cb_{N-3}(L_1)$ | $Cr_{N-3}(L_1)$ | $Cb_{N-1}(L_1)$ | $Cr_{N-1}(L_1)$ |
| $Y_1(L_3)$ | $Y_2(L_3)$ | $Y_3(L_3)$ | $Y_4(L_3)$ |
| ⋮ | | | |
| $Cb_{N-3}(L_{M-1})$ | $Cr_{N-3}(L_{M-1})$ | $Cb_{N-1}(L_{M-1})$ | $Cr_{N-1}(L_{M-1})$ |

FIG.15

| Address Offset | 1st byte | 2nd byte | 3rd byte | 4th byte |
|---|---|---|---|---|
| 00 00 00 00$_{16}$ | Y1(L1) | Y2(L1) | Cb1(L1) | Cr1(L1) |
| 00 00 00 04$_{16}$ | Y3(L1) | Y4(L1) | Cb3(L1) | Cr3(L1) |
| ⋮ | | ⋮ | | |
| 00 00 05 9C$_{16}$ | Y719(L1) | Y720(L1) | Cb719(L1) | Cr719(L1) |
| 00 00 05 A0$_{16}$ | Y1(L2) | Y2(L2) | Cb1(L2) | Cr1(L2) |
| ⋮ | | ⋮ | | |
| 00 0A 8B FC$_{16}$ | Y719(L480) | Y720(L480) | Cb719(L480) | Cr719(L480) |

FIG.16

| Address Offset | 1st byte | 2nd byte | 3rd byte | 4th byte |
|---|---|---|---|---|
| 00 00 00 00$_{16}$ | Y1(L1) | Y2(L1) | Y1(L2) | Y2(L2) |
| 00 00 00 04$_{16}$ | Cr1(L1) | Cr1(L1) | Y3(L1) | Y4(L1) |
| 00 00 00 08$_{16}$ | Y3(L2) | Y4(L2) | Cb3(L1) | Cr3(L1) |
| ⋮ | ⋮ | | | |
| 00 07 E8 F8$_{16}$ | Cb717(L479) | Cr717(L479) | Y719(L479) | Y720(L479) |
| 00 07 E8 FC$_{16}$ | Y719(L480) | Y720(L480) | Cb719(L479) | Cr719(L479) |

FIG.17

| Address Offset | 1st byte | 2nd byte | 3rd byte | 4th byte |
|---|---|---|---|---|
| 00 00 00 00$_{16}$ | Y1(L1) | Y2(L1) | Y3(L1) | Y4(L1) |
| ⋮ | | ⋮ | | |
| 00 00 02 CF$_{16}$ | Y717(L1) | Y718(L1) | Y719(L1) | Y720(L1) |
| 00 00 02 D0$_{16}$ | Cb1(L1) | Cr1(L1) | Cb3(L1) | Cr3(L1) |
| ⋮ | | ⋮ | | |
| 00 00 05 9F$_{16}$ | Cb717(L1) | Cr717(L1) | Cb719(L1) | Cr719(L1) |
| 00 00 05 A0$_{16}$ | Y1(L2) | Y2(L2) | Y3(L2) | Y4(L2) |
| ⋮ | | ⋮ | | |
| 00 0A 8B FC$_{16}$ | Cb717(L480) | Cr717(L480) | Cb719(L480) | Cr719(L480) |

FIG.18

| Address Offset | 1st byte | 2nd byte | 3rd byte | 4th byte |
|---|---|---|---|---|
| $00\ 00\ 00\ 00_{16}$ | Y1(L1) | Y2(L1) | Y3(L1) | Y4(L1) |
| ⋮ | | ⋮ | | |
| $00\ 00\ 02\ CF_{16}$ | Y717(L1) | Y718(L1) | Y719(L1) | Y720(L1) |
| $00\ 00\ 02\ D0_{16}$ | Y1(L2) | Y2(L2) | Y3(L2) | Y4(L2) |
| ⋮ | | ⋮ | | |
| $00\ 00\ 05\ 9F_{16}$ | Y717(L2) | Y718(L2) | Y719(L2) | Y720(L2) |
| $00\ 00\ 05\ A0_{16}$ | Cb1(L1) | Cr1(L1) | Cb3(L1) | Cr3(L1) |
| ⋮ | | ⋮ | | |
| $00\ 00\ 08\ 6F_{16}$ | Cb717(L1) | Cr717(L1) | Cb719(L1) | Cr719(L1) |
| $00\ 00\ 08\ 70_{16}$ | Y1(L3) | Y2(L3) | Y3(L3) | Y4(L3) |
| ⋮ | | ⋮ | | |
| $00\ 07\ E8\ FC_{16}$ | Cb717(L479) | Cr717(L479) | Cb719(L479) | Cr719(L479) |

FIG.19

| | msb | | | | | | lsb |
|---|---|---|---|---|---|---|---|
| opcode | \multicolumn{7}{c|}{OPERATION MODE2($51_{16}$)} |
| operand [0] | \multicolumn{7}{c|}{subfunction} |
| operand [1] | \multicolumn{7}{c|}{status} |
| operand [2] | \multicolumn{7}{c|}{reserved} |
| operand [3] | | | | | | | |
| operand [4] | | | | | | | |
| operand [5] | \multicolumn{7}{c|}{print_job_ID} |
| ⋮ | | | | | | | |
| operand [16] | | | | | | | |
| operand [17] | \multicolumn{7}{c|}{Operation_mode2_parameters} |
| ⋮ | | | | | | | |
| operand [31] | | | | | | | |

FIG.20

| Value | Symbol | Meaning |
|---|---|---|
| $01_{16}$ | get | Get the current operation modes |
| $02_{16}$ | set | Set the specified operation modes |
| $03_{16}$ | query | Get the supported operation modes |
| Other values | – | Reserved |

FIG.21

| Address Offset | Contents |
|---|---|
| $00_{16}$ | media_type |
| $01_{16}$ | Media_size |
| $02_{16}$ | |
| $03_{16}$ | |
| $04_{16}$ | reserved |
| $05_{16}$ | Print_quality |
| $06_{16}$ | Mono_color |
| $07_{16}$ | offset |
| $08_{16}$ | |
| $09_{16}$ | |
| $0A_{16}$ | |
| $0B_{16}$ | Layout_type |
| $0C_{16}$ | |
| $0D_{16}$ | |
| $0E_{16}$ | |

FIG.22

| address offset | msb | | | | | | lsb |
|---|---|---|---|---|---|---|---|
| $00_{16}$ | device_dependent | Plain_paper | Bond_paper | Special_paper | Photo_paper | Transparency_film | Reserved |

FIG.23

| Symbol | Meaning |
|---|---|
| device_dependent | The image output will be sized as device dependent. (Mandatory) |
| Plain_paper | NORMAL PAPER |
| Bond_paper | SEAL |
| Special_paper | SPECIAL PAPER |
| Photo_paper | PHOTOGRAPHIC PAPER |
| Transparency_film | OHP FILM |

FIG.24

| address offset | msb | | | | | | lsb |
|---|---|---|---|---|---|---|---|
| $00_{16}$ | device_dependent | A5 | A4 | B5 | Executive | Letter | Legal | Reserved |
| $01_{16}$ | Hagaki | Oufuku_Hagaki | A6 | Index_4×6 | Index_5×8 | A3 | B4 | Legal_11X17 |
| $02_{16}$ | Commercial0_portrait | Commercial0_landscape | DL | C6 | A2 | Custom | reserved | |

FIG.25

| Symbol | Meaning |
|---|---|
| Device_dependent | The image output will be sized as device dependent. (Mandatory) |
| A5 | ISO and JIS A5 |
| A4 | ISO and JIS A4 |
| B5 | JIS B5 |
| Executive | US Executive |
| Letter | US Letter |
| Legal | US Legal |
| Hagaki | POSTCARD |
| Oufuku_hagaki | DOUBLE POSTAL CARD |
| A6 | ISO and JIS A6 Card |
| Index_4×6 | US Index Card4"×6" |
| Index_5×8 | US Index Card5"×3" |
| A3 | ISO A3 |
| B4 | B4 |
| Legal_11×17 | Legal 11×17 |
| Commercial10_portrait | US Comercial#10(portrait) |
| Commercial10_landscape | US Comercial#10(landscape) |
| DL | International DL |
| C6 | International C6 |
| A2 | US A2 |
| Custom | Custom paper |

FIG.26

| address offset | msb | | | | | | lsb |
|---|---|---|---|---|---|---|---|
| $00_{16}$ | device-dependent | other | letter | legal | | | reserved |
| $01_{16}$ | na_10×13_envelope | na_9×12_envelope | na_number_ID_envelope | na_7×9_envelope | na_9×11_envelope | na_10×14_envelope | na_6×9_envelope | na_10×15_envelope |
| $02_{16}$ | a | b | c | d | e | | reserved | |
| $03_{16}$ | iso a0 | iso a1 | iso a2 | iso a3 | iso a4 | iso a5 | iso a6 | iso a7 |
| $04_{16}$ | iso a8 | iso a9 | iso a10 | | | Reserved | | |
| $05_{16}$ | iso b0 | iso b1 | iso b2 | iso b3 | iso b4 | iso b5 | iso b6 | iso b7 |
| $06_{16}$ | iso b8 | iso b9 | iso b10 | | | Reserved | | |
| $07_{16}$ | iso c0 | iso c1 | iso c2 | iso c3 | iso c4 | iso c5 | iso c6 | iso c7 |
| $08_{16}$ | iso c8 | iso_designated | | | reserved | | | |
| $09_{16}$ | jis b0 | jis b1 | jis b2 | jis b3 | jis b4 | jis b5 | jis b6 | jis b7 |
| $0A_{16}$ | jis b8 | jis b9 | jis b10 | | reserved | | | |
| $0B_{16}$ | index_4×6 | index_5×8 | reserved | | Japanese_hagaki | Japanese_oufuku_hagaki | reserved | |

FIG.27

| Value | Symbol | Meaning | Width | Height |
|---|---|---|---|---|
| $00_{16}$ | device_dependent | The paper alze will be used as device dependent | – | – |
| $01_{16}$ | other | other | | |
| $10_{16}$ | letter | North American letter size | 8.5 inch | 11 inch |
| $11_{16}$ | legal | North American letter size | 8.5 inch | 14 inch |
| $20_{16}$ | na_10×13_envelope | North American 10×13 envelope size | 10 inch | 13 inch |
| $21_{16}$ | na_9×12_envelope | North American 9×12 envelope | 9 inch | 12 inch |
| $22_{16}$ | na_number_10_envelope | North American number 10business envelope | 4.125 inch | 9.5 inch |
| $23_{16}$ | na_7×9_envelope | North American 7×9 | 7 inch | 9 inch |
| $24_{16}$ | na_9×11_envelope | North American 9×11 | 9 inch | 11 inch |
| $25_{16}$ | na_10×14_envelope | North American 10×14 envelope | 10 inch | 14 inch |
| $26_{16}$ | na_6×9_envelope | North American 6×9 envelope | 6 inch | 9 inch |
| $27_{16}$ | na_10×15_envelope | North American 10×15 envelope | 10 inch | 15 inch |
| $30_{16}$ | a | engineering A | 8.5 inch | 11 inch |
| $31_{16}$ | b | engineering B | 11 inch | 17 inch |
| $32_{16}$ | c | engineering C | 17 inch | 22 inch |
| $33_{16}$ | d | engineering D | 22 inch | 34 inch |
| $34_{16}$ | e | engineering E | 34 inch | 44 inch |
| $40_{16}$ | iso a0 | ISO A0 | 841mm | 1189mm |
| $41_{16}$ | iso a1 | ISO A1 | 594mm | 841mm |
| $42_{16}$ | iso a2 | ISO A2 | 420mm | 594mm |
| $43_{16}$ | iso a3 | ISO A3 | 297mm | 420mm |
| $44_{16}$ | iso a4 | ISO A4 | 210mm | 297mm |
| $45_{16}$ | iso a5 | ISO A5 | 148mm | 210mm |
| $46_{16}$ | iso a6 | ISO A6 | 105mm | 148mm |
| $47_{16}$ | iso a7 | ISO A7 | 74mm | 105mm |
| $48_{16}$ | iso a8 | ISO A8 | 52mm | 74mm |
| $49_{16}$ | iso a9 | ISO A9 | 37mm | 52mm |
| $4A_{16}$ | iso a10 | ISO A10 | 26mm | 37mm |

FIG.28

| Value | Symbol | Meaning | Width | Height |
|---|---|---|---|---|
| $50_{16}$ | iso b0 | ISO B0 | 1000mm | 1414mm |
| $51_{16}$ | iso b1 | ISO B1 | 707mm | 1000mm |
| $52_{16}$ | iso b2 | ISO B2 | 500mm | 707mm |
| $53_{16}$ | iso b3 | ISO B3 | 353mm | 500mm |
| $54_{16}$ | iso b4 | ISO B4 | 250mm | 353mm |
| $55_{16}$ | iso b5 | ISO B5 | 176mm | 250mm |
| $56_{16}$ | iso b6 | ISO B6 | 125mm | 176mm |
| $57_{16}$ | iso b7 | ISO B7 | 88mm | 125mm |
| $58_{16}$ | iso b8 | ISO B8 | 62mm | 88mm |
| $59_{16}$ | iso b9 | ISO B9 | 44mm | 62mm |
| $5A_{16}$ | iso b10 | ISO B10 | 31mm | 44mm |
| $60_{16}$ | iso c0 | ISO C0 | 917mm | 1297mm |
| $61_{16}$ | iso c1 | ISO C1 | 648mm | 917mm |
| $62_{16}$ | iso c2 | ISO C2 | 458mm | 648mm |
| $63_{16}$ | iso c3 | ISO C3 | 324mm | 458mm |
| $64_{16}$ | iso c4 | ISO C4 | 229mm | 324mm |
| $65_{16}$ | iso c5 | ISO C5 | 162mm | 229mm |
| $66_{16}$ | iso c6 | ISO C6 | 114mm | 162mm |
| $67_{16}$ | iso c7 | ISO C7 | 81mm | 114mm |
| $68_{16}$ | iso c8 | ISO C8 | 57mm | 81mm |
| $69_{16}$ | iso designated | ISO Designated Long | 110mm | 220mm |
| $70_{16}$ | iso b0 | ISO B0 | 1030mm | 1456mm |
| $71_{16}$ | iso b1 | ISO B1 | 728mm | 1030mm |
| $72_{16}$ | iso b2 | ISO B2 | 515mm | 728mm |
| $73_{16}$ | iso b3 | ISO B3 | 364mm | 515mm |
| $74_{16}$ | iso b4 | ISO B4 | 257mm | 364mm |
| $75_{16}$ | iso b5 | ISO B5 | 182mm | 257mm |
| $76_{16}$ | iso b6 | ISO B6 | 128mm | 182mm |
| $77_{16}$ | iso b7 | ISO B7 | 91mm | 128mm |
| $78_{16}$ | iso b8 | ISO B8 | 64mm | 91mm |
| $79_{16}$ | iso b9 | ISO B9 | 45mm | 64mm |
| $7A_{16}$ | iso b10 | ISO B10 | 32mm | 45mm |
| $80_{16}$ | index 4×6 | North American Index card 4"×6" | 4 inch | 6 inch |
| $81_{16}$ | index 5×8 | North American Index card 5"×8" | 5 inch | 8 inch |
| $90_{16}$ | Japanese_hagaki | JapaneseHagakiPostcard | 100mm | 148 mm |
| $91_{16}$ | Japanese_oufuku_hagaki | JapaneseOufukuHagakiPostcard | 148mm | 200mm |

FIG.29

| Symbol | Meaning |
|---|---|
| device_dependent | The image output will be sized as device dependent. (Mandatory) |
| economy | SPEED FIRST |
| normal | NORMAL |
| best | QUALITY FIRST |

FIG.31

| Symbol | Meaning |
|---|---|
| device_dependent | The image output will be sized as device dependent. (Mandatory) |
| mono | MONOCHROME PRINT |
| color | COLOR PRINT |

FIG.33

| Symbol | Meaning |
|---|---|
| device_dependent | The image output will be sized as device dependent. |
| black_white | BLACK-AND-WHITE PRINT |
| mono | MONOCHROME (GRAY SCALE) PRINT |
| color | COLOR PRINT |

FIG.35

| Symbol | Meaning |
|---|---|
| Offset_top<br>Offset_left | $X000_{16}$~$X999_{16}$ : OFFSET POSITION PACKED BY BCD (00.0 ~99.9mm, $X=0_{16}$ : PLUS (INWARD DIRECTION OF SHEET), $X=8_{16}$ : MINUS (OUTWARD DIRECTION OF SHEET))<br>$FFFF_{16}$ : device_dependent |

FIG.37

| Symbol | Meaning |
|---|---|
| Layout_type | $00000000_{16}$ ~ $0FFFFFFF_{16}$ : TYPE OF LAYOUT<br>$FFFFFFFF_{16}$ : device_dependent |

FIG.39

| | msb | | | | | | lsb |
|---|---|---|---|---|---|---|---|
| opcode | \multicolumn{7}{c}{OPERATION MODE($41_{16}$)} |
| operand [0] | \multicolumn{7}{c}{subfunction} |
| operand [1] | \multicolumn{7}{c}{status} |
| operand [2] | \multicolumn{7}{c}{next_pic} |
| operand [3] | \multicolumn{7}{c}{next_page} |
| operand [4] | | | | | | | |
| operand [5] | \multicolumn{7}{c}{print_job_ID} |
| ⋮ | | | | | | | |
| operand [16] | | | | | | | |
| operand [17] | \multicolumn{7}{c}{operation_ mode_parameters} |
| ⋮ | | | | | | | |
| operand [24] | | | | | | | |
| operand [25] | \multicolumn{7}{c}{operation_ mode_optional_parameters} |
| ⋮ | | | | | | | |
| operand [29] | | | | | | | |

FIG.40

| Address Offset | Contents |
|---|---|
| $00_{16}$ | media_type |
| $01_{16}$ | media_size |
| $02_{16}$ | print_quality |
| $03_{16}$ | mono_color |
| $04_{16}$ | rendering_intent |

FIG.41

1 : IT IS RAINY TODAY
2 : IT WILL BE CLOUDY TOMORROW
3 : IT WAS WARM YESTERDAY
4 : X X X X X X
5 : Y Y Y Y Y Y
6 : Z Z Z Z Z Z
7 : X X X X X X
8 : Y Y Y Y Y Y
9 : Z Z Z Z Z Z
10 : X X X X X X
11 : Y Y Y Y Y Y
12 : Z Z Z Z Z Z
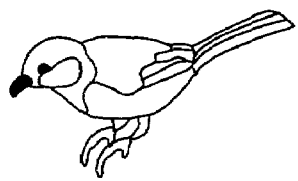
1 : X X X X X X
2 : Y Y Y Y Y Y
3 : Z Z Z Z Z Z
4 : . . . . . .
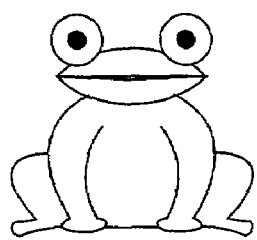
FIG.45

1 : IT IS RAINY TODAY
2 : IT WILL BE CLOUDY TOMORROW
3 : IT WAS WARM YESTERDAY
4 : X X X X X
5 : Y Y Y Y Y
6 : Z Z Z Z Z
7 : X X X X X
8 : Y Y Y Y Y
9 : Z Z Z Z Z
10 : X X X X X
11 : Y Y Y Y Y
12 : Z Z Z Z Z
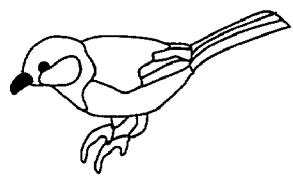
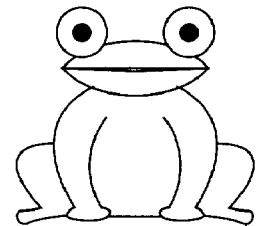
FIG.47

| | msb | | | | | | lsb |
|---|---|---|---|---|---|---|---|
| opcode | CAPTURE($XX_{16}$) | | | | | | |
| opcode [0] | subfunction | | | | | | |
| opcode [1] | source_subunit_type | | | | | source_subunit_ID | |
| opcode [2] | source_plug | | | | | | |
| opcode [3] | status | | | | | | |
| opcode [4] | reserved | | | | | | |
| opcode [5] | print_job_ID | | | | | | |
| ⋮ | | | | | | | |
| opcode [16] | | | | | | | |
| opcode [17] | data_size=$00000000_{16}$ | | | | | | |
| opcode [18] | | | | | | | |
| opcode [19] | | | | | | | |
| opcode [20] | | | | | | | |
| opcode [21] | image_size_x=$0000_{16}$ | | | | | | |
| opcode [22] | | | | | | | |
| opcode [23] | image_size_y=$0000_{16}$ | | | | | | |
| opcode [24] | | | | | | | |
| opcode [25] | image_format_specifier=$0001_{16}$(Dont Care) | | | | | | |
| opcode [26] | Next_pic | | | | | | |
| opcode [27] | Next_page | | | | | | |
| opcode [28] | | | | | | | |

FIG.48

| | msb | | | | | | lsb |
|---|---|---|---|---|---|---|---|
| opcode | \multicolumn{7}{c}{CAPTURE(XX$_{16}$)} |
| opcode [0] | subfunction |||||||
| opcode [1] | source_subunit_type |||| source_subunit_ID |||
| opcode [2] | source_plug |||||||
| opcode [3] | status |||||||
| opcode [4] | reserved |||||||
| opcode [5] | print_job_ID |||||||
| ⋮ | |||||||
| opcode [16] | |||||||
| opcode [17] | data_size=00000000$_{16}$ |||||||
| opcode [18] | |||||||
| opcode [19] | |||||||
| opcode [20] | |||||||
| opcode [21] | image_size_x=0000$_{16}$ |||||||
| opcode [22] | |||||||
| opcode [23] | image_size_y=0000$_{16}$ |||||||
| opcode [24] | |||||||
| opcode [25] | image_format_specifier=0000$_{16}$(sRGBraw) |||||||
| opcode [26] | Next_pic |||||||
| opcode [27] | Next_page |||||||
| opcode [28] | |||||||

FIG.49

| Value | Sub-Value | Type | Meaning |
|---|---|---|---|
| $30_{16}$ | | | sRGB raw |
| | $00_{16}$ | sRGB raw | |
| | $01_{16}$ | sRGB raw, quadlet | |
| $31_{16}$ | | | YCC raw |
| | $0X_{16}$ | YCC 4:2:2 raw | |
| | $1X_{16}$ | YCC 4:2:0 raw | |
| | $X0_{16}$ | Pixel ratio 1.00×1.00/ITU-RBT.709-2/pixel | |
| | $X1_{16}$ | Pixel ratio 1.19×1.00/ITU-RBT.709-2/pixel | |
| | $X2_{16}$ | Pixel ratio 0.89×1.00/ITU-RBT.709-2/pixel | |
| | $X3_{16}$ | Pixel ratio 0.89×1.00/ITU-RBT.709-4/pixel | |
| | $X8_{16}$ | Pixel ratio 1.00×1.00/ITU-RBT.709-2/line | |
| | $X9_{16}$ | Pixel ratio 1.19×1.00/ITU-RBT.709-2/line | |
| | $XA_{16}$ | Pixel ratio 0.89×1.00/ITU-RBT.709-2/line | |
| | $XB_{16}$ | Pixel ratio 0.89×1.00/ITU-RBT.709-4/line | |
| $10_{16}$ | | | DCF Object |
| | $00_{16}$ | Exif2.1 | |
| | $01_{16}$ | JFIF | |
| | $02_{16}$ | TIFF | |
| | $0F_{16}$ | JPEG | |
| $80_{16} \sim 8F_{16}$ | $00_{16} \sim FF_{16}$ | Vendor Dependent format | |
| $FE_{16}$ | | | Special meaning |
| | $00_{16}$ | Unit Plug Defined | |
| | $01_{16}$ | Don't care | |
| | $02_{16}$ | Null | |

FIG.50

| Value | Symbol | Meaning |
|---|---|---|
| $01_{16}$ | receive | Receive the image |
| $02_{16}$ | skip | Skin the image area |
| $03_{16}$ | resume | Resume from the bus reset |
| $04_{16}$ | query | Get the supported values |
| Other values | – | Reserved |

FIG.51

IMAGE PRINTING SYSTEM

TECHNICAL FIELD

This invention relates to an image processing device and method, a printing device and method, an image printing system and method, and a recording medium having image processing and printing programs stored therein which are suitable for the use in a system for printing an image by using a printer device connected through an interface conformable to the IEEE (the Institute of Electrical and Electronics Engineers) 1394 standard.

BACKGROUND ART

The IEEE 1394 standard defines the physical and electrical standard for connectors provided in various equipments which are interconnected. As the equipments having such interfaces conformable to the IEEE 1394 standard are physically connected, hot plug and play for automatically carrying out high-speed transmission/reception of digital data and connection setting between the equipments can be realized. The IEEE 1394 standard has become popular as the serial interface standard standardized in the industry.

The IEEE 1394 interface has also become popular as the interface for connecting AV equipments, as well as in the computer field. Specifically, in the case where an STB (set top box) for receiving satellite broadcast and displaying it on a television unit and a printer device for printing an image are connected with each other through the IEEE 1394 interface, the STB controls the printer device by using the FCP (function control protocol) and AV/C protocol. In this case, the STB and the printer device have the FCP and AV/C protocol mounted thereon and operate in accordance with the FCP command and AV/C command.

In an image printing system having a printer device which is connected through the conventional IEEE 1394 interface and has the FCP and AV/C protocol mounted thereon and a controller for controlling the printer device, when printing a static image, setting items defined by the operation mode (operation_mode_parameters) indicating information for carrying out print setting are designated by the controller and stored into an asynchronous packet, and printing is carried out by the printer device. In this case, the controller carries out print setting in accordance with a request from the user. Such print setting is proposed in "1394 TRADE ASSOCIATION TA Document XXXXXXX AV/C Printer Subunit Specification Version 1.0 Draft 0.5: 145."

Specifically, when printing by the printer device is controlled by the controller, the user sets information for setting the relation of an image and a print sheet in three stages of large, medium and small sizes (sizing), information for setting the printing direction of the print sheet (orientations), information for setting the printing position of the image (posx, posy), information indicating what number of times the same image should be printed within the print sheet (multiple_tiled), information indicating how many images should be printed on one page (number_of_pics), and information indicating how many copies should be printed (number_of_copies). The user stores these pieces of information into an asynchronous packet and transmits it to the printer device so as to carry out printing.

Meanwhile, in such controller and printer device, for example, if the information indicating how many images should be printed on one page is set so as to print four images on one page, four images contracted to 1/4 are allocated to the respective areas generated by quadrisecting one sheet, as shown in FIG. 1.

However, in such controller and printer device, in the case of printing a plurality of images on one page, printing cannot be made in such a manner that a blank area is partly provided. For example, in the case of printing four images on one page, it is not possible to provide a blank area for one image and allocate three images contracted to 1/4 in the respective areas, as shown in FIG. 2.

The present Applicant proposed the contents of the Japanese Patent Application No. H11-261279, which is the base of priority of the present application, to the IEEE 1394 Trade Association for standardization at suitable timing, and the contents of the proposal are made public as the following drafts by the IEEE 1394 Trade Association:

AV/C Printer Subunit Specification Version 1.0, Draft 0.97: 60 (2Q00 AVWG Off-Cycle Meeting on May 24–25, 2000); and AV/C Printer Subunit Specification Version 1.0, Draft 0.7: 5 (1Q00 TA QM AV-WG on Jan. 18, 2000).

DISCLOSURE OF THE INVENTION

Thus, in view of the foregoing status of the art, it is an object of the present invention to provide a print processing device and method which enables provision of a blank area in a part of one page in the case of printing a plurality of images on one page by an equipment connected through an interface conformable to the IEEE 1394 standard.

It is another object of the present invention to provide a printing device and method which enables provision of a blank area in a part of one page in the case of printing a plurality of images on one page by an equipment connected through an interface conformable to the IEEE 1394 standard.

It is another object of the present invention to provide an image printing system and method which enables provision of a blank area in a part of one page in the case of printing a plurality of images on one page by an equipment connected through an interface conformable to the IEEE 1394 standard.

It is still another object of the present invention to provide a recording medium having an image processing program and a printing program stored therein which enables provision of a blank area in a part of one page in the case of printing a plurality of images on one page by an equipment connected through an interface conformable to the IEEE 1394 standard.

An image processing device according to the present invention comprises: image processing means for performing image processing on an image signal inputted from outside and thus generating image data; control information generation means for generating print control information including information indicating the number of print images on one page of a print sheet; and output means for including the image data generated by the image processing means and the print control information generated by the control information generation means into a packet conformable to the IEEE 1394 standard and outputting the packet to a printing device; the control information generation means generating print control information including information which includes a blank image in the image to be printed on the print sheet.

An image processing method according to the present invention comprises the steps of: performing image processing on an image signal inputted from outside and thus generating image data; generating print control information including information indicating the number of print images on one page of a print sheet and information indicating inclusion of a blank area in the image to be printed on the print sheet; and including the generated image data and the print control information into a packet conformable to the IEEE 1394 standard and outputting the packet to a printing device.

An image processing method according to the present invention comprises the steps of: performing image processing on an image signal inputted from outside and thus generating image data; generating a command instructing start of a print job with respect to the generated image data, a command including information indicating the number of print images on one page of a print sheet, and a capture command including print control information with respect to the generated image data; including the generated image data and the respective commands into a packet conformable to the IEEE 1394 standard and outputting the packet to a printing device; and in the case where a blank image is included in an image area to be printed on the print sheet, setting the data quantity of image data and the number of pixels in an X-direction and a Y-direction at zero as print control information with respect to the blank image and setting the capture command at a value indicating that the image type of the image data is not considered.

A printing device according to the present invention comprises: input means to which image data included in a packet conformable to the IEEE 1394 standard and print control information including information indicating the number of print images on one page of a print sheet and information indicating inclusion of a blank image in the image to be printed on the print sheet are inputted; and printing means for printing an image represented by the image data inputted to the input means in accordance with the print control information; the printing means setting an image area to be printed on the print sheet as a blank area in the case where the print control information including information indicating inclusion of a blank image is inputted.

A printing method according to the present invention comprises the steps of: receiving input of image data included in a packet conformable to the IEEE 1394 standard and print control information including information indicating the number of print images on one page of a print sheet and information indicating inclusion of a blank image in the image to be printed on the print sheet; printing an image represented by the inputted image data in accordance with the print control information; and setting an image area to be printed on the print sheet as a blank area in the case where the print control information including information indicating inclusion of a blank image in the image to be printed on the print sheet is inputted.

A printing method according to the present invention comprises the steps of: performing image processing on an image signal inputted from outside and thus generating image data; receiving input of the image data included in a packet conformable to the IEEE 1394 standard, a command instructing start of a print job with respect to the image data, a command including information indicating the number of print images on one page of a print sheet, and a capture command including print control information with respect to the generated image data; and setting an image area to be printed on the print sheet as a blank area in the case where the capture command is inputted which sets the data quantity of image data and the number of pixels in an X-direction and a Y-direction at zero as print control information and which is set at a value indicating that the image type of the image data is not considered An image printing system according to the present invention comprises: a print processing device including image processing means for performing image processing on an image signal inputted from outside and thus generating image data, control information generation means for generating print control information including information indicating the number of print images on one page of a print sheet, and output means for including the image data generated by the image processing means and the print control information generated by the control information generation means into a packet conformable to the IEEE 1394 standard and outputting the packet, the control information generation means generating print control information including information which includes a blank image in the image to be printed on the print sheet; and a printing device including input means to which image data included in a packet conformable to the IEEE 1394 standard and print control information including information indicating the number of print images on one page of a print sheet and information indicating inclusion of a blank image in the image to be printed on the print sheet are inputted, and printing means for printing an image represented by the image data inputted to the input means in accordance with the print control information, the printing means setting an image area to be printed on the print sheet as a blank area in the case where the print control information including information indicating inclusion of a blank image is inputted.

An image printing method according to the present invention comprises the steps of: performing image processing on an image signal inputted from outside and thus generating image data; generating print control information including information indicating the number of print images on one page of a print sheet and information indicating inclusion of a blank image in the image to be printed on the print sheet; including the generated image data and the print control information into a packet conformable to the IEEE 1394 standard and outputting the packet to a printing device; receiving the image data included in a packet conformable to the IEEE 1394 standard and the print control information including information indicating the number of print images on one page of a print sheet and information indicating inclusion of a blank image in the image to be printed on the print sheet; printing an image represented by the received image data in accordance with the print control information; and setting an image area to be printed on the print sheet as a blank area in the case where the print control information including information indicating inclusion of a blank image in the image to be printed on the print sheet is inputted.

A recording medium according to the present invention has an image processing program stored therein, the image processing program comprising the steps of: performing image processing on an image signal inputted from outside and thus generating image data; generating print control information including information indicating the number of print images on one page of a print sheet and information indicating inclusion of a blank image in the image to be printed on the print sheet; and including the generated image data and the print control information into a packet conformable to the IEEE 1394 standard and outputting the packet to a printing device.

A recording medium according to the present invention has a printing program stored therein, the printing program comprising the steps of: receiving input of image data included in a packet conformable to the IEEE 1394 standard and print control information including information indicating the number of print images on one page of a print sheet and information indicating inclusion of a blank image in the image to be printed on the print sheet; printing an image represented by the inputted image data in accordance with the print control information; and setting an image area to be printed on the print sheet as a blank area in the case where the print control information including information indicating inclusion of a blank image in the image to be printed on the print sheet is inputted.

BRIEF DESCRIPTION OF THE DRAWINGS

FIG. 1 illustrates an example of print in which four images contracted to 1/4 are allocated to the respective areas generated by quadrisecting one sheet.

FIG. 8 illustrates the image type of a static image.

FIG. 9 shows the data structure of an asynchronous packet including a capture command.

FIG. 10 illustrates the name of image type stored in "image_format_specifier".

FIG. 11 illustrates another example of image type stored in "image_format_specifier".

FIG. 12 illustrates the transmission order of pixel data in point-sequential transmission of static image data with a pixel format of YCC 4:2:2 to the printer device.

FIG. 13 illustrates the transmission order of pixel data in point-sequential transmission of static image data with a pixel format of YCC 4:2:0 to the printer device.

FIG. 14 illustrates the transmission order of pixel data in line-sequential transmission of static image data with a pixel format of YCC 4:2:2 to the printer device.

FIG. 15 illustrates the transmission order of pixel data in line-sequential transmission of static image data with a pixel format of YCC 4:2:0 to the printer device.

FIG. 16 illustrates point-sequential transmission of a static image of an image type 480_422_4×3.

FIG. 17 illustrates point-sequential transmission of a static image of an image type 480_420_4×3.

FIG. 18 illustrates line-sequential transmission of the static image of the image type 480_422_4×3.

FIG. 19 illustrates plane-sequential transmission of the static image of the image type 480_420_4×3.

FIG. 20 shows the data structure of an asynchronous packet including an operation mode 2 command.

FIG. 21 illustrates the contents of "subfunction" included in the operation mode 2 command.

FIG. 22 illustrates the contents of "Operation_mode2_parameters" included in the operation mode 2 command.

FIG. 23 illustrates the contents of "media_type" included in "Operation_mode2_parameters".

FIG. 24 illustrates the meaning of each setting item included in "media_type".

FIG. 25 illustrates the contents of "media_size" included in "Operation_mode2_parameters".

FIG. 26 illustrates the meaning of each setting item included in "media_size".

FIG. 27 illustrates another example of contents of "media_size" included in "Operation_mode2_parameters".

FIG. 28 illustrates the meaning of another example of the meaning of each setting item included "media_size".

FIG. 29 illustrates the meaning of still another example of the meaning of each setting item included "media_size".

FIG. 31 illustrates the meaning of each setting item included in "print_quality".

FIG. 33 illustrates the meaning of each setting item included in "mono_color".

FIG. 35 illustrates another example of the meaning of each setting item included in "mono_color".

FIG. 37 illustrates the meaning of each setting item included in "offset".

FIG. 39 illustrates the meaning of "layout_type".

FIG. 40 illustrates another example of the command packet including the operation mode command.

FIG. 41 illustrates the meaning of each setting item included in the command packet including the operation mode command.

FIG. 45 illustrates an example of print in the case where four images are allocated on one print sheet by the image printing system to which the present invention is applied.

FIG. 47 illustrates an example of print in which a blank area can be produced in the case where four images are allocated on one print sheet.

FIG. 48 illustrates the contents of a capture command transmitted to the printer device for producing a blank area.

FIG. 49 illustrates the contents of another capture command transmitted to the printer device for producing a blank area.

FIG. 50 illustrate an image type set for producing a blank area.

FIG. 51 illustrates information to be stored in "subfunction" of a capture command which is set for producing a blank area.

BEST MODE FOR CARRYING OUT THE INVENTION

Preferred embodiments of the present invention will now be described in detail with reference to the drawings.

Figure 2:
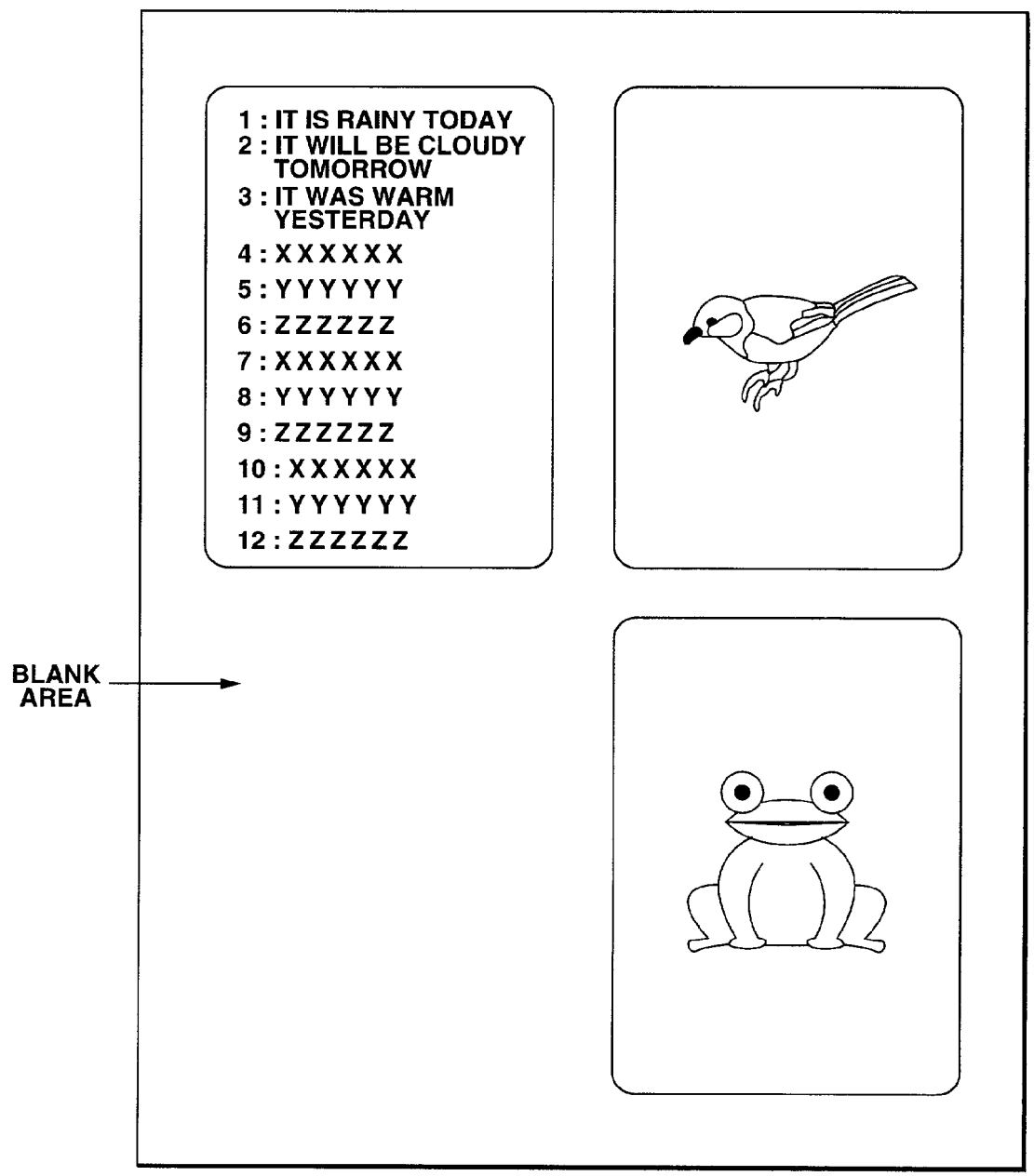
FIG. 2 illustrates an example of print in which a blank area can be produced in the case where four images are allocated on one print sheet.
Figure 3:
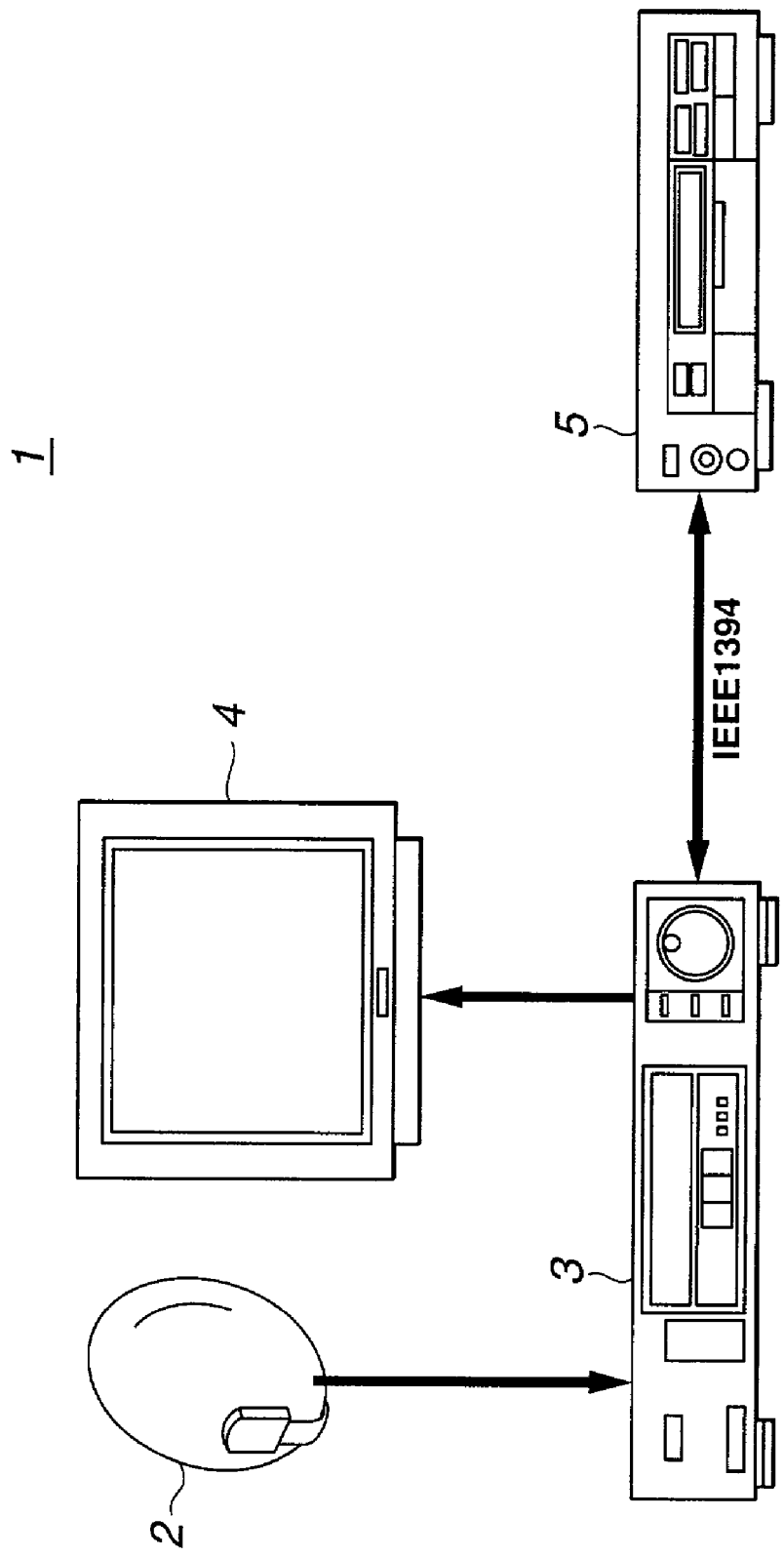
FIG. 3 shows an image printing system to which the present invention is applied.

An image printing system to which the present invention is applied is constituted, for example, as shown in FIG. 3.

This image printing system 1 includes an antenna 2 for receiving a dynamic image broadcast through, for example, a communication satellite, an STB (set top box) 3 for performing predetermined signal processing on the received dynamic image data, a television unit 4 for displaying a dynamic image or a static image, and a printer device 5 for printing and outputting the image.

The antenna 2 receives an image signal indicating a dynamic image and outputs the image signal to the STB 3. The image signal received by the antenna 2 is generated by superimposing image signals of multiple channels, and the dynamic image data is compressed in accordance with, for example, the MPEG (Moving Picture Experts Group) system and encrypted in accordance with a predetermined encryption system.

As dynamic image data in accordance with the NTSC (National Television System Committee) system is inputted to the television unit 4 through the STB 3, the television unit 4 displays the dynamic image. Also, in the case where the television unit 4 is an HDTV, it displays the dynamic image as the dynamic image data in conformity with the HD (high definition) standard is inputted. The television unit 4 has the display state controlled by the STB 3 and also displays a static image and character information or the like.

Figure 4:
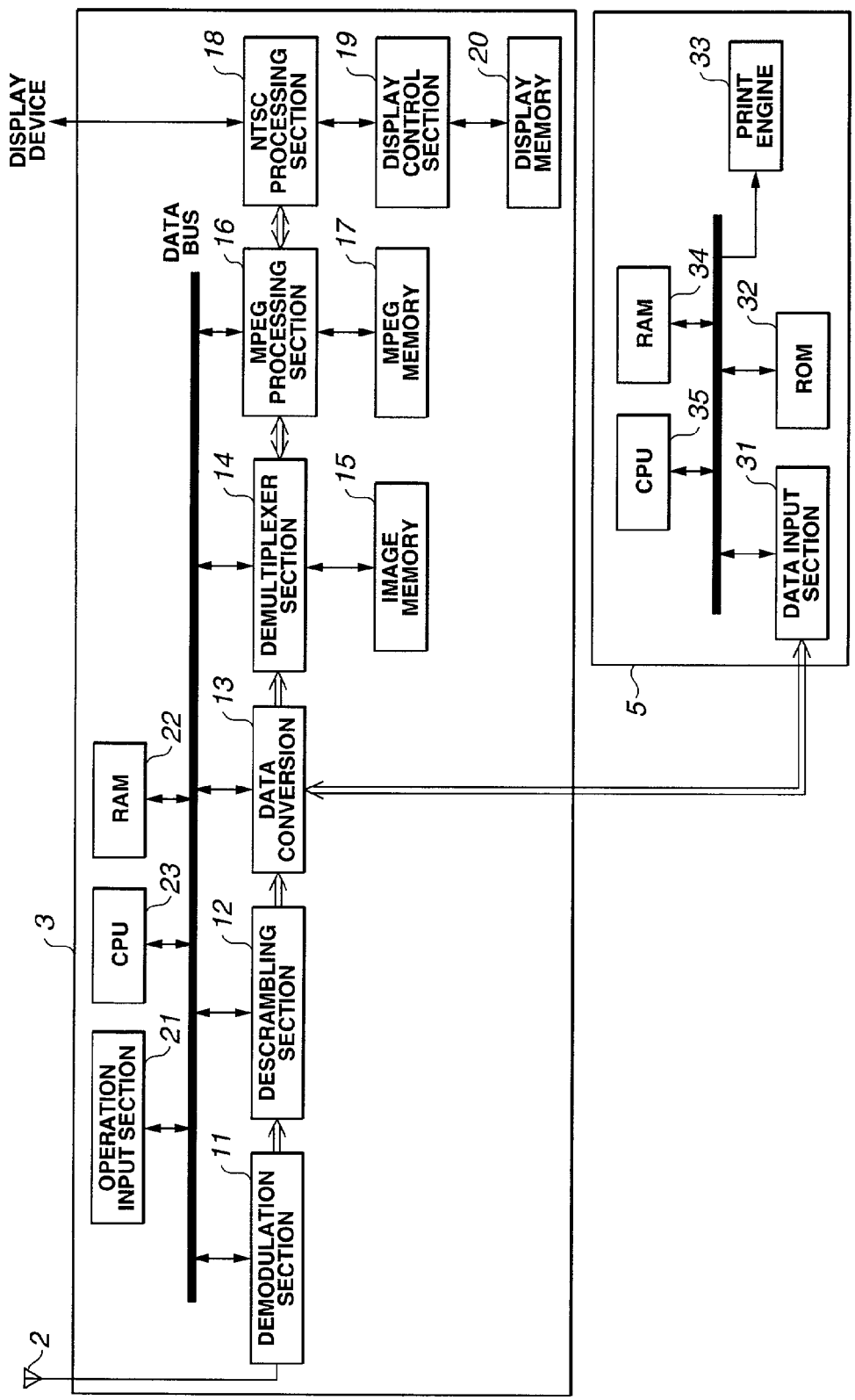
FIG. 4 is a block diagram showing the structure of an STB and a printer device constituting the image printing system to which the present invention is applied.

The STB 3 has a demodulation section 11 for performing demodulation processing on the image signal received by the antenna 2, a descrambling section 12 for performing decryption processing on the dynamic image data, a data conversion section 13 for performing data conversion processing in conformity with the IEEE 1394 standard, a demultiplexer section 14 for carrying out processing to extract the dynamic image data in a predetermined channel, an image memory 15, an MPEG processing section 16 for carrying out decoding processing, a decoding memory 17, an NTSC encoding section 18 for converting the data to data to be displayed on the screen of the television unit 4, a display control section 19, a display memory 20, an operation input section 21 to which an instruction from the user is inputted, a RAM (random access memory) 22, and a CPU (central processing unit) 23 for controlling each section, as shown in FIG. 4.

In the STB 3, the demodulation section 11, the descrambling section 12, the data conversion section 13, the demultiplexer section 14, the MPEG processing section 16, the operation input section 21, the RAM 22 and the CPU 23 are connected to a bus and the processing operation of the respective sections is controlled by the CPU 23 via the bus.

To the demodulation section 11, for example, an analog image signal indicating a dynamic image stream is inputted from the antenna 2. The demodulation section 11 performing demodulation processing and A/D conversion processing on the image signal from the antenna 2 and outputs the resultant digital dynamic image data to the descrambling section 12. Also, a control signal from the CPU 23 is inputted to the demodulation section 11 via the bus, and the demodulation section 11 performing demodulation processing and A/D conversion processing based on the control signal.

The descrambling section 12 carries out decryption processing with respect to the dynamic image data from the demodulation section 11. Specifically, the encrypted dynamic image data is inputted to the descrambling section 12, and the descrambling section 12 carries out decryption processing in accordance with the encryption system of the inputted dynamic image data. Then, the descrambling section 12 outputs the decrypted dynamic image data to the data conversion section 13. A control signal from the CPU 23 is inputted to the descrambling section 12 via the bus, and the descrambling section 12 carried out decryption processing using the encryption key information included in the control signal.

The data conversion section 13 is constituted, for example, by an interface circuit conformable to the IEEE 1394 standard. The data conversion section 13 performs signal processing in conformity with the IEEE 1394 standard with respect to the dynamic image data from the descrambling section 12 in response to the control signal from the CPU 23, thereby carrying out processing to include the inputted dynamic image data or static image data into a packet conformable to the IEEE 1394 standard. In this case, the data conversion section 13 carries out processing to generate an isochronous packet when transmitting temporally continuous data such as dynamic image data, or to generate an asynchronous packet 100 as shown in FIG. 5 when transmitting static data such as static image data, a command, or data for connection setting.

Figures 5, 6:
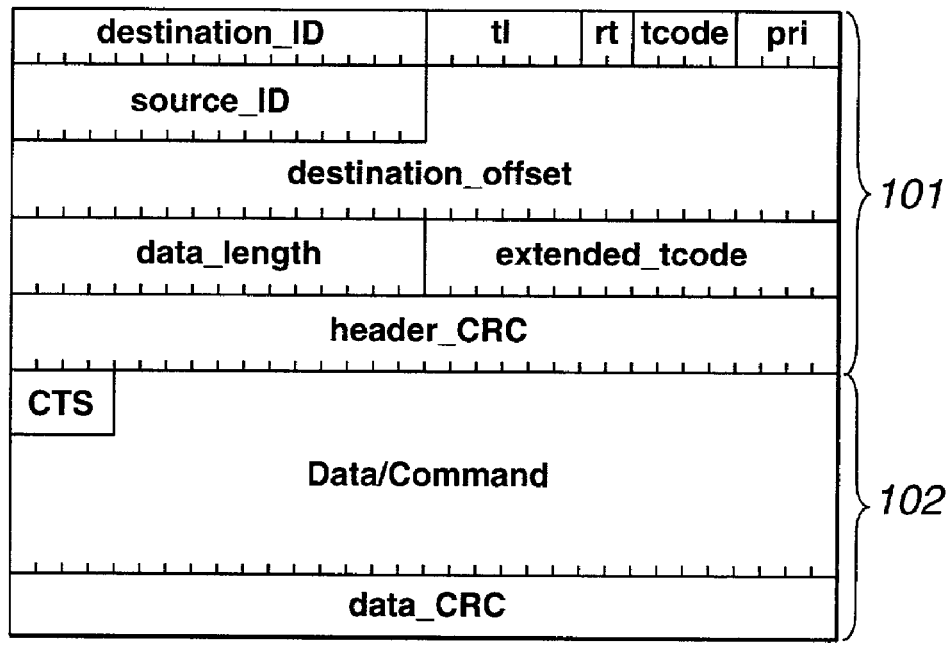
FIG. 5 shows the data structure of an asynchronous packet transmitted/received between the STB and the printer device.
FIG. 6 shows the data structure of a data part of the asynchronous packet.

The asynchronous packet 100 shown in FIG. 5 has a header portion 101 conformable to the IEEE 1394 standard, and a data portion 102.

In the header portion 101, the ID of the packet receiving side, that is, destination ID indicating the ID of the printer device 5 (destination_ID), transaction label (tl), retry code (rt), priority (pri), ID of the packet transmitting side, that is, source ID indicating the ID of the STB 3 (source ID), destination_offset indicating the memory address of the packet receiving side, data field length (data_length), extended transaction code (extended_tcode), and CRC of the header field indicating CRC with respect to the header portion 101 (header_CRC) are stored.

In the data portion 102, the data field containing the data conformable to the FCP (Function Control Protocol) and AV/C protocol, and data CRC indicating CRC with respect to the data portion 102 (data_CRC) are stored.

In the data field, as the information conformable to the FCP, the CTS (Command Transaction set), command type, subunit_type indicating the type of the subunit of the packet receiving side (subunit_type), and subunit ID indicating the ID of the subunit of the packet receiving side (subunit_ID) are stored, as shown in FIG. 6. The subunit of the packet receiving side corresponds to the data input section 31 of the printer device 5, and type of the subunit of the packet receiving side is expressed by "00010" in the case of the printer device 5.

In the data field, the static image data to be transmitted to the printer device 5 (data) and the AV/C command with respect to the printer device 5 (command) are stored subsequent to the subunit ID. The command stored in the data field is a command included in the command set referred to as the AV/C command for controlling the printer device 5. When the type of the FCP is classified and the packet to be transmitted is a command, if its value is 0000, the AV/C command defined by the AV/C digital interface command set of IEEE 1394 is stored in the data field of the data portion 102 as the CTS.

When outputting the isochronous packet to the outside, the data conversion section 13 transmits the isochronous packet at a regular interval.

Figure 7:
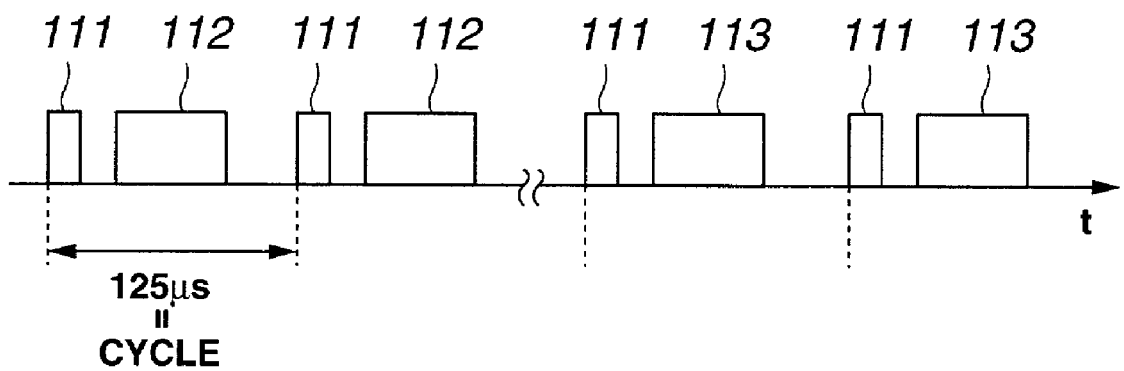
FIG. 7 is a time chart in transmitting the asynchronous packet from a data conversion section to a data input section.

When transmitting the asynchronous packet 100 including static image data to be printed by the printer device 5, the data conversion section 13 transmits the asynchronous packet 100 in a cycle of 125 microseconds, as shown in FIG. 7. In this case, the data conversion section 13 first transmits a cycle start packet 111 as the asynchronous packet 100 in which cycle time data (cycle_time_data) indicating the cycle start (Cycle_start) is included in the header portion 101, and then transmits a command packet 112 in which a capture command indicating that static image data is to be sent at a gap of a predetermined time period is included in the data portion 102. Then, the data conversion section 13 transmits in each cycle a data packet 113 in which the static image data is stored in the data portion 102, to the printer device 5 which received the capture command.

When outputting the static image data to the printer device 5, the data conversion section 13 follows the asynchronous arbitration. That is, when outputting the static image data to the printer device 5, the data conversion section 13 outputs each asynchronous packet 100 including the static image data in accordance with the response from the printer device 5.

Specifically, the data conversion section 13 carries out processing in the transaction layer, link layer and physical layer, with the serial bus managed in conformity with the IEEE 1394 standard. Thus, the data conversion section 13 sets the connection relation with the printer device 5 in accordance with the control from the CPU 23, then generates the asynchronous packet 100 including the static image data and the overhead as control information, and transmits in each cycle the asynchronous packet 100 to the printer device 5 connected in conformity with the IEEE 1394 standard, thus carrying out time-sharing control.

On the other hand, when the dynamic image data received by the STB 3 is to be displayed as it is on the television unit 4 without carrying out processing in conformity with the IEEE 1394 standard, the data conversion section 13 outputs the dynamic image data from the descrambling section 12 to the demultiplexer section 14 on the basis of the control signal from the CPU 23.

The demultiplexer 14 carries out channel selection processing to select the channel designated by the CPU 23 from the plural channels superimposed on the dynamic image data from the data conversion section 13, and outputs only the dynamic image data representing the designated channel to the MPEG processing section 16.

To the demultiplexer section 14, the static image data including luminance information and color-difference information is inputted from the MPEG processing section 16 under the control of the CPU 23. The demultiplexer section 14 stores the static image data to the image memory 15 and outputs the static image data to the data conversion section 13 in accordance with the control from the CPU 23.

The MPEG processing section 16 carries out decoding processing in conformity with the MPEG standard with respect to the dynamic image data from the demultiplexer section 14 on the basis of the control signal from the CPU 23, thereby outputting non-compressed dynamic image data to the NTSC processing section 18. Thus, the MPEG processing section 16 forms each frame constituting the dynamic image as an image (hereinafter referred to as YCC image) consisting of pixel data including the luminance information (Y) and the color-difference information (Cr, Cb). In this case, the MPEG processing section 16 uses as the work area the dynamic image data of plural frames, which is the decoding processing target, while sequentially storing the dynamic image data to the MPEG memory 17.

The MPEG processing section 16 generates a YCC image of a pixel format such that the sampling frequency ratio of the luminance information Y, color-difference information Cr and color-difference information Cb is 4:2:2, that is, a pixel format produced by vertically or horizontally halving the color-difference information Cr, Cb with respect to the luminance information Y. Also, the MPEG processing section 16 vertically and horizontally halves the color-difference information Cr, Cb with respect to the luminance information Y, and thus generates a YCC image of a pixel format such that the sampling frequency ratio of the luminance information Y, color-difference information Cr and color-difference information Cb is 4:2:0. In the pixel format of 4:2:0, though odd lines have the sampling frequency ratio of 4:2:0 without including the color-difference information Cb while even lines have the sampling frequency ratio of 4:0:2 without including the color-difference information Cr, the ratio of 4:2:0 is used as a representative ratio. The MPEG processing section 16 may also generate a YCC image having a pixel format of 4:4:4 without reducing the color-difference information Cr, Cb as well as the image formats of 4:2:2: and 4:2:0.

The MPEG processing section 16 carries out encoding processing in conformity with the MPEG standard with respect to the dynamic image data from the NTSC processing section 18 on the basis of the control signal indicating the compression rate or the like from the CPU 23. Thus, the MPEG processing section compresses the dynamic image data in the direction of time base and in the spatial direction, and outputs the compressed dynamic image data to the demultiplexer section 14. In this case, the MPEG processing section 16 carries out processing to store the dynamic image data of the plural frames as the encoding processing target to the MPEG memory 17.

The NTSC processing section 18 carries out encoding processing so that the dynamic image data inputted from the MPEG processing section 16 is processed to become dynamic image data of the NTSC system that can be displayed on the screen of the television unit 4, and then outputs the resultant dynamic image data to the television unit 4.

The display control section 19 carries out processing to display the dynamic image data of the NTSC system on the television unit 4 by the NTSC processing section 18. In this case, the display control section 19 sequentially stores the data as the processing target to the display memory 20.

Specifically, the display control section 19 carries out processing to control the image size of each frame constituting the dynamic image data when displayed on the television unit 4, to the size of 720 pixels×480 pixels in the NTSC system or 1920 horizontal pixels×1080 vertical pixels in the HD (high definition) system, in accordance with the television unit 4. In this case, when generating data of one pixel, the display control section 19 carries out processing to output data to the television unit 4 by using 16-bit information used in the pixel format such that the sampling frequency ratio of the luminance signal Y, color-difference signal Cr and color-difference signal Cb is 4:2:2 or information used in the pixel format such that the sampling frequency ratio of the luminance signal Y, color-difference signal Cr and color-difference signal Cb is 4:2:0.

Moreover, not only in the case of outputting to the television unit 4 in accordance with the above-described system, the display control section 19 may also generate an image of an image type (Image Type) defining the size of the image (pixel_x, pixel_y), scanning direction (interlaced/progressive), pixel format (pixel format), aspect ratio of the screen (screen aspect ratio), aspect ratio of the pixel (pixel aspect ratio), and the data quantity (image size), as shown in FIG. 8. In FIG. 8, an image type having pixel_y of 720 pixels, a pixel format of 4:2:2 and a screen aspect ratio of 16:9 is referred to as 720_422_16×9. The display control section 19 is also capable of generating static images of image types 720_422_16×9 and 720_420_16×9, which are image types of the digital television broadcasting system used in the United States. The display control section 19 is also capable of generating images of 576_422_4×3 and 522_420_4×3, which are image types in accordance with the PAL (phase alternation by line) system.

The operation input section 21 generates an operation input signal and outputs it to the CPU 23, as the user operates an operation button or the like provided on the STB 3. Specifically, the operation input section 21 generates an operation input signal to the effect that the dynamic image displayed on the television unit 4 by the user is to be temporarily stopped to print the static image by the printer device 5.

When generating the operation input signal to the effect that the static image is to be printed by the printer device 5, the operation input section 21 generates an operation input signal designating the print sheet type setting, print sheet size setting, print quality setting, print color setting, position offset setting and layout setting in accordance with the print setting screen displayed on the television unit 4, and outputs the operation input signal to the CPU 23.

The CPU 23 generates a control signal for controlling the above-described respective sections constituting the STB 3, on the basis of the operation input signal from the operation input section 21.

When displaying the image signal received by the antenna 2, the CPU 23 outputs control signals to the demodulation section 11, the descrambling section 12, the data conversion section 13, the demultiplexer section 14 and the MPEG processing section 16, thus carrying out control so that demodulation, decryption processing, channel selection processing and decoding processing in conformity with the MPEG standard are carried out with respect to the dynamic image data.

The CPU 23 also generates a control signal so as to read into the image memory 15 the static image data of a frame unit stored in the display memory 20 at the time point when the operation input signal is inputted, of the dynamic image displayed on the television unit 4 in accordance with the operation input signal from the operation input section 21.

Moreover, when the operation input signal to the effect that print setting is to be carried out is inputted to the CPU 23 from the operation input section 21, the CPU 23 controls the display control section 19 to display the print setting screen on the television unit 4 and carries out control so as to output the operation input signal in accordance with the above-described various print settings to the data conversion section 13.

When the operation input signal to the effect that an image having static image data generated is to be printed by the printer device 5 is inputted to the CPU 23, the CPU 23 controls the demultiplexer section 14 and the data conversion section 13, and thus carries out control so as to output a YCC image which is static image data of a frame unit stored in the image memory 15 and which includes luminance information Y and color-difference information Cr, Cb to the printer device 5 through the data conversion section 13, which is the interface circuit conformable to the IEEE 1394 standard.

In this case, when transmitting the static image data to the printer device 5 under the control of the CPU 23, the data conversion section 13 transmits the asynchronous packet 100 having stored therein a capture command as shown in FIG. 9 subsequent to the subunit ID shown in FIG. 6, and thus transmits the capture command for receiving the static image data to the printer device 5.

In the capture command shown in FIG. 9, a capture (CAPTURE) command as opcode (operation code), expressed by a hexadecimal number $XX_{16}$, is stored. Subsequently, "subfunction" is stored as operand[0], and as operand[1], "source_subunit_type" is stored in upper five bits and "source_subunit_ID" is stored in lower three bits. As operand[2], "source_plug" is stored. As operand[3], "status" is stored. As operand[4], "dest_plug" is stored. Subsequently, in the capture command, "print_job_ID" is stored as operand[5] to operand[16], "data_size" is stored as operand[17] to operand[20], "image_size_x" is stored as operand[21] to operand[22], "image_size_y" is stored as operand[23] to operand[24], "image_format_specifier" is stored as operand[25], "reserved" is set as operand[27] to operand[29], "Next_pic" is stored as operand[30], and "Next_page" is stored as operand[31] to operand[32].

The above-mentioned "source_subunit_type" is the information indicating the type of the subunit for transmitting the asynchronous packet 100 from the side of the STB 3, and "source_subunit_ID" is the ID of the subunit for transmitting the asynchronous packet 100. "Source_plug" is the plug number of the subunit for transmitting the asynchronous packet 100, and "dest_plug" is the plug number of the subunit for receiving the asynchronous packet 100. "Print_job_ID" is the ID of processing (job) for printing one static image. "Data size" is the data quantity transmitted from the STB 3 to the printer device 5 when printing the static image by the printer device 5. "Image_size_x" is the number of pixels in the x-direction corresponding to the image type shown in FIG. 8, and "image_size_y" is the number of pixels in the y-direction corresponding to the image type. "Image_format_specifier" is the name of the image type. "Reserved" is constituted by an arbitrary number of bits and is provided for setting the number of bits of the entire capture command to a multiple of 4. By providing this "reserved", a suitable number of bits as a data unit can be set when transmitting a packet conformable to the IEEE 1394 standard.

In "image_format_specifier", the name of the image type discriminated by a hexadecimal value (Value) is stored, as shown in FIG. 10. In FIG. 10, "chunky" in the name of the image type indicates a static image transmitted point-sequentially from the data conversion section 13 to the printer device 5, and "liner" indicates a static image transmitted line-sequentially from the data conversion section 13 to the printer device 5.

In "image_format_specifier", there may also be stored the name of the image type expressed by a hexadecimal value (Value, Sub-value) as shown in FIG. 11 and not including the information related to the number of pixels unlike the image type shown in FIG. 10, as well as the description of the name of the image type as shown in FIG. 10. In this case, the number of pixels to be printed by the printer device 5 is defined by "image_size_x" described as operands[21] to [22] of the capture command shown in FIG. 9 and "image_size_y" described as operands[23] to [24].

For example, when hexadecimal 00 (Meaning: sRGB raw) is described in msb of "image_format_specifier", it is indicated that image data is transmitted as RGB data to the printer device 5. When hexadecimal 00 is described in msb of "image_format_specifier" and hexadecimal 00 (Type: sRGB raw) is described in lsb, RGB data is transmitted in the order of R, G, B, R, G, B, . . . . When 01 (Type: sRGB raw, quadlet) is described in lsb, RGB data is transmitted in the order of R, G, B, 0, R, G, B, 0, . . . . That is, when 00 is described in msb, O-data is transmitted between B and R and thus 4-byte data consisting of R, G, B, 0 as a unit is transmitted.

When hexadecimal 01 (Meaning: YCC raw) is described in msb of "image_format_specifier", it is indicated that image data is transmitted as YCC data to the printer device 5. Moreover, when hexadecimal 01 is described in msb of "image_format_specifier" and hexadecimal 0X (X is a variable) (Type: YCC4:2:2:raw/pixel) is described in lsb, luminance information and color-difference information are point-sequentially (chunky) transmitted in the pixel format of 4:2:2, and when 1X (Type: YCC4:2:2:raw/line) is described in lsb, data of the pixel format of 4:2:2 is line-sequentially (liner) transmitted. When hexadecimal 8X (Type: YCC4:2:0 raw/chunky) is described in lsb, luminance information and color-difference information are point-sequentially (chunky) transmitted in the pixel format of 4:2:0, and when 9X (Type: YCC4:2:0 raw/line) is described in lsb, data of the pixel format of 4:2:0 is line-sequentially (liner) transmitted.

Meanwhile, when hexadecimal 01 (Meaning: YCC raw) is described in msb of "image_format_specifier" and hexadecimal X0 to XC is described in lsb, designation of the pixel ratio (Pixel ratio 1.00×1.00, Pixel ratio 1.19×1.00, or Pixel ratio 0.89×1.00), designation of the color space (ITU-R (International telecommunications Union-Radiocommunication Sector) BT.709-2, ITU-R BT.601-4, or ITU-R BT.1203), and designation of point-sequential (chunky) or line-sequential (line) are carried out so as to transmit data. Moreover, when hexadecimal X0 to X4 is described in lsb, it is indicated that an interlaced image is transmitted, and when X8 to XC is described in lsb, it is indicated that a progressive image is transmitted. Furthermore, when X0 to X2 and X8 to XA are described in lsb, it is indicated that data conformable to ITU-R BT.709-2 is transmitted. When X3 and XB are described, it is indicated that data conformable to ITU-R BT.601-4 is transmitted. When X4 and XC are described, it is indicated that data conformable to ITU-R BT.1203 (PAL system) is transmitted.

When hexadecimal 10 (Meaning: DCF Object) is described in msb of "image_format_specifier", it is indicated that image data is transmitted in the format prescribed in the digital camera (DCF: Design rule for Camera Format) to the printer device 5. Moreover, when hexadecimal 10 is described in msb of "image_format_specifier" and hexadecimal 00 (Type: Exif2.1) is described as lsb, it is indicated that the image portion is transmitted in the Exif format such that a header having recorded therein the shooting status and conditions in the JPEG format is added. When hexadecimal 01 (Type: JFIF (JPEG File Interplay Format)) is described in lsb, it is indicated that image data of the JFIF format is transmitted. When 02 (Type: TIFF (Tag Image File Format)) is described in lsb, it is indicated that image data of the TIFF format is transmitted. When 0F (Type: JPEG (Joint Photographic Coding Experts Group) is described, it is indicated that image data is transmitted in the JPEG format to the printer device 5.

Moreover, when hexadecimal 80 to 8F is described in msb of "image_format_specifier", it is indicated that image data is transmitted in other formats, and data of the format designated by 00 to FF described in lsb is transmitted.

In "image_format_specifier", apart from the above-described examples, hexadecimal FE (Meaning: Special meaning) in msb and 00 (Type: Unit Plug defined), 01 (Don't care) in lsb can be provided.

After transmitting the asynchronous packet 100 having the capture command stored therein and receiving ACK (acknowledge) from the printer device 5, the data conversion section 13 transmits the asynchronous packet 100 including static image data to the printer device 5.

The transmission rules for static image data are as shown in FIGS. 12 to 15.

FIG. 12 shows the transmission order of pixel data in point-sequential (chunky) transmission of static image data with a pixel format of YCC 4:2:2 to the printer device 5.

FIG. 13 shows the transmission order of pixel data in point-sequential (chunky) transmission of static image data with a pixel format of YCC 4:2:0 to the printer device 4.

FIG. 14 shows the transmission order of pixel data in line-sequential (liner) transmission of static image data with a pixel format of YCC 4:2:2 to the printer device 5.

FIG. 15 shows the transmission order of pixel data in line-sequential (liner) transmission of static image data with a pixel format of YCC 4:2:0 to the printer device 5.

In FIGS. 12 to 15, Yi(Lj) indicates luminance information Y having a pixel number i included in a line number j. The pixel number i used for designating the pixel of the luminance information Y has an integer value of 1 to N, and the line number j has an integer value of 1 to M. Cbi(Lj) indicates color-difference information Cb having a pixel number i included in a line number j. The pixel number i used for designating the pixel of the color-difference information Cb has a value of 1, 3, 5, . . . , N−1, and the line number j has an integer value of 1 to M in the case of YCC 4:2:2 or a value of 1, 3, 5, . . . , N−1 in the case of YCC 4:2:0. Cri(Lj) indicates color-difference information Cr having a pixel number i included in a line number j. The pixel number i used for designating the pixel of the color-difference information Cr has a value of 1, 3, 5, . . . , N−1, and the line number j has an integer value of 1 to M in the case of YCC 4:2:2 or a value of 1, 3, 5, . . . , N−1 in the case of YCC 4:2:0. N indicates the total number of pixels in one line. M indicates the total number of lines within one screen.

In this case, when point-sequentially (chunky) transmitting to the printer device 5 the static image data included in the asynchronous packet 100 having an image type of 480_422_4×3 shown in FIG. 10 and constituted by pixels with the pixels numbers 1 to 720 provided in the x-direction and the line numbers 1 to 480 provided in the y-direction, the data conversion section 13 transmits the pixel data as shown in FIG. 16.

Specifically, subsequent to the address offset (address_offset), the data conversion section 13 transmits the luminance information Y1(L1), luminance Y2(L1), color-difference information Cb1(L1) and color-difference information Cr1(L1) with respect to the pixel number 1 included in the line number 1. Then, subsequent to the pixel data up to the pixel number 720 included in the line number 1, the data conversion section 13 transmits the luminance information and color-difference information of the next line number 2 and subsequent line numbers. The data conversion section 13 transmits the pixel data up to the pixel number 720 included in the line number 480, thereby completing transmission of the static image data representing one static image.

When the image type is 480_420_4×3, the data conversion section 13 transmits the luminance information Y1(L1), luminance information Y2(L1), luminance information Y1(L2) and luminance information Y2(L2) with respect to the pixel number 1 included in the line number 1 subsequent to the address offset (address_offset), and then transmits the color-difference information Cb1(L1), color-difference information Cr1(L1), luminance information Y3(L1) and luminance information Y4(L1) included in the pixel data of the pixel number 1, as shown in FIG. 17. Then, the data conversion section 13 transmits the pixel data up to the pixel number 720 included in the line number 480, thereby completing transmission of the static image data representing one static image.

When line-sequentially transmitting the static image data having the image type of 480_422_4×3 included in the asynchronous packet 100, the data conversion section 13 transmits the luminance information Y1(L1), luminance information Y2(L1), luminance information Y3(L1), luminance information Y4(L1), . . . , luminance information Y720(L1) with respect to the line number 1 subsequent to the address offset (address_offset), and then transmits the color-difference information Cb1(L1), color-difference information Cr1(L1), . . . , color-difference information Cb720(L1) and color-difference information Cr720(L1) with respect to the line number 1, as shown in FIG. 18. Then, the data conversion section 13 transmits the luminance information and color-difference information of the line number 2 and subsequent line numbers, and transmits the color-difference information Cr720(L480) of the line number 480, thereby completing transmission of the static image data.

When line-sequentially transmitting the static image data having the image type of 480_420_4×3 included in the asynchronous packet 100, the data conversion section 13 first transmits the luminance information Y1(L1) to luminance information Y720(L1) of the line number 1, the transmits the luminance information Y1(L2) to luminance information Y720(L2) of the line number 2, and then transmits the color-difference information Cb1(L1), color-difference information Cr1(L1) to color-difference information Cb720(L1), color-difference information Cr719(L1) of the line number 1, thus transmitting the pixel data of the line number 1 and the line number 2, as shown in FIG. 19. Then, the data conversion section 13 transmits the luminance information and color-difference information of the line number 3 and subsequent line numbers, and transmits the color-difference information Cb719(L479) and color-difference information Cr719(LA79), thereby completing transmission of the static image data.

Moreover, when carrying out print setting by designating the print sheet type setting, print sheet size setting, print quality setting, print color setting, position offset setting and layout setting in accordance with the operation input signal from the operation input section 21, the data conversion section 13 stores into the command packet the operation mode 2 (OPERATION MODE2) parameters (hereinafter referred to as operation mode 2 parameter) included in the operation mode 2 command shown in FIG. 20 which is different from "operation_mode_parameters" (hereinafter referred to as operation mode 1 parameter) already proposed by the IEEE 1394 standard.

The operation mode 1 parameters include information for setting the relation of an image and a print sheet in three stages of large, medium and small sizes (sizing), information for setting the printing direction of the print sheet (orientations), information for setting the printing position of the image (posx, posy), information indicating what number of times the same image should be printed within the print sheet (multiple_tiled), information indicating how many images should be printed on one page (number_of_pics), and information indicating how many copies should be printed (number_of_copies).

In the operation mode 2 command shown in FIG. 20, information indicating the operation mode 2 (OPERATION MODE2) command as opcode (operation code), expressed by hexadecimal "51", is stored. Subsequently, "subfunction" is stored as operand[0], "status" is stored as operand[1], and "reserved" is stored as operand[2] to operand[4]. Then, "print_job_ID" is stored as operand[5] to operand[16], and "Operation_mode2_parameters" (operation mode 2 parameters) indicating the specific contents of the print setting of the operation mode 2 command are stored as operand[17] to operand[31].

In "subfunction", information expressed by hexadecimal 01 and referred as "get", information expressed by hexadecimal 02 and referred to as "set", or information expressed by hexadecimal 03 and referred to as "query" is stored, as shown in FIG. 21.

The data conversion section 13 stores "get" in "subfunction" when obtaining the operation mode 2 parameters indicating the print setting information of the printer device 5, or stores "set" when setting the operation mode 2 parameters of the print device 5, or stores "query" when wishing to know the possible setting range of the operation mode 2 parameters of the print device 5. With respect to information expressed by other numbers than hexadecimal 01, 02 and 03, "reserved" is provided in "subfunction".

When responding to the operation mode 2 command from the data conversion section 13, the data input section 31, which will be described later, generates an asynchronous packet in which the contents of "subfunction" are changed.

In "Operation_mode2_parameters", print sheet type information (media_type), print sheet size information (Media_size), reserved area (reserved), print quality information (Print_quality), print color information (Mono_color), print offset position information (offset), and layout setting information (Layout_type) are stored, as shown in FIG. 22.

In the print sheet type information (media_type), one bit is allocated to each setting item and a plurality of setting items are sequentially arranged, as shown in FIGS. 23 and 24. Specifically, "device_dependent", "Plain_Paper" (normal paper), "Bond_paper" (seal), "Special_paper" (special paper), "Photo_paper" (photographic paper), and "Transparency_film" (OHP film) are sequentially arranged. The bit for each setting item is established by the data conversion section 13 or the data input section 31, thereby designating the type of the print sheet. In the print sheet type information, when the user does not specify the print sheet and the printer device 5 is caused to select the optimum print sheet type, the bit for "device_dependent" is established.

In the print sheet size information (Media_size), "device_dependent", "A5" (ISO and JIS A5), "A4" (ISO and JIS A4), "B5" (JIS B5), "Executive" (US Executive), "Letter" (US Letter), "Legal" (US Legal), "Reserved", "Hagaki" (postcard), "Oufuku_hagaki" (double postal card), "A6" (ISO and JIS A6 Card), "Index_4×6" (US Index Card 4"×6"), "Index 5×8" (US Index Card 5"×8"), "A3" (ISO A3), "B4", "Legal 11×17", "Commercial10_portrait" (US Commercial#10 (portrait)), "Commercial10_landscape" (US Commercial#10 (landscape)), "DL" (International DL), "C6" (International C6), "A2" (US A2), and "Custom" (Custom paper) are stored, as shown in FIGS. 25 and 26. This print sheet size information designates the size of the print sheet as the bit for each setting item is established by the data conversion section 13 or the data input section 31.

As another example of the print sheet size information (Media_size), "device_dependent" and "other" are stored, and the subsequently prescribed "letter" (North American letter size), "legal" (North American legal size), "na__10×13_envelope" (North American 10×13 envelope), "na__9×12 envelope" (North American 9×12 envelope), na_number__10_envelope (North American 10 business envelope), "na__7×9_envelope" (North American 7×9), "na__9×11_envelope" (North American 9×11), "na__10×14_envelope" (North American 10×14 envelope), "na__6×9_envelope" (North American 6×9 envelope), "na__10×15_envelope" (North American 10×15 envelope), "a" (engineering A), "b" (engineering B), "c" (engineering C), "d" (engineering D), "iso a0" (ISO A0), "iso a1" (ISO A1), "iso a2" (ISO A2), "iso a3" (ISO A3), "iso a4" (ISO A4), "iso a5" (ISO A5), "iso a6" (ISO A6), "iso a7" (ISO A7), "iso a8" (ISO A8), "iso a9" (ISO A9), "iso a10" (ISO A10), "iso b0" (ISO B0), "iso b1" (ISO B1), "iso b2" (ISO B2), "iso b3" (ISO B3), "iso b4" (ISO B4), "iso b5" (ISO B5), "iso b6" (ISO B6), "iso b7" (ISO B7), "iso b8" (ISO B8), "iso b9" (ISO B9), "iso b10" (ISO B10), "iso c0" (ISO C0), "iso c1" (ISO C1), "iso c2" (ISO C2), "iso c3" (ISO C3), "iso c4" (ISO C4), "iso c5" (ISO C5), "iso c6" (ISO C6), "iso c7" (ISO C7), "iso c8" (ISO C8), "iso designated" (ISO Designated Long), "jis b0" (JIS B0), "jis b1" (JIS B1), "jis b2" (JIS B2), "jis b3" (JIS B3), "jis b4" (JIS B4), "jis b5" (JIS B5), "jis b6" (JIS B6), "jis b7" (JIS B7), "jis b8" (JIS B8), "jis b9" (JIS B9), "jis b10" (JIS B10), "index__4×6" (North American Index Card 4"×6"), "index__5×8" (North American Index Card 5"×8"), "japanese_hagaki" (Japanese Hagaki Postcard), and "japanese_ouhuku_hagaki" (Japanese Ouhuku-Hagaki Postcard) are sequentially stored, as shown in FIGS. 27, 28 and 29. The size of the print sheet is designated as the bit for each setting item is established by the data conversion section 13 or the data input section 31.

Figure 30:
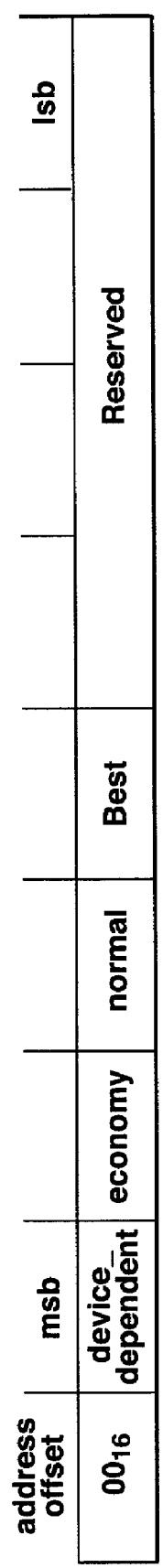
FIG. 30 illustrates the contents of "print_quality" included in "Operation_mode2_parameters".

In the print quality information (Print_quality), "device_dependent", "economy" (speed first), "normal" (normal), and "best" (quality first) are stored, as shown in FIGS. 30 and 31. In this print quality information, the print quality is designated as the bit for each setting item is established by the data conversion section 13 or the data input section 31.

Figure 32:
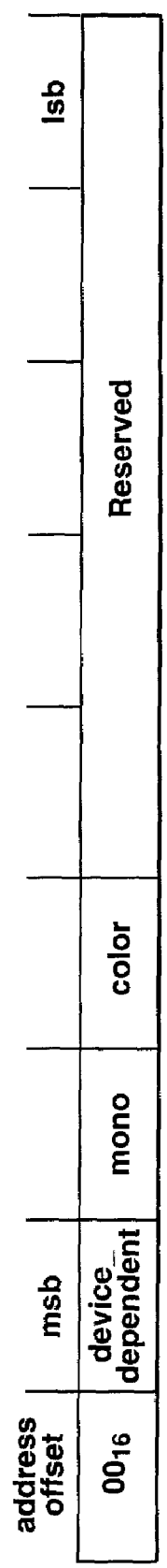
FIG. 32 illustrates the contents of "mono_color" included in "Operation_mode2_parameters".

In the print color information (Mono_color), "device_dependent", "mono" (monochrome print), and "color" (color print) are stored, as shown in FIGS. 32 and 33. In this print color information, the print color is designated as the bit for each setting item is established by the data conversion section 13 or the data input section 31.

Figure 34:
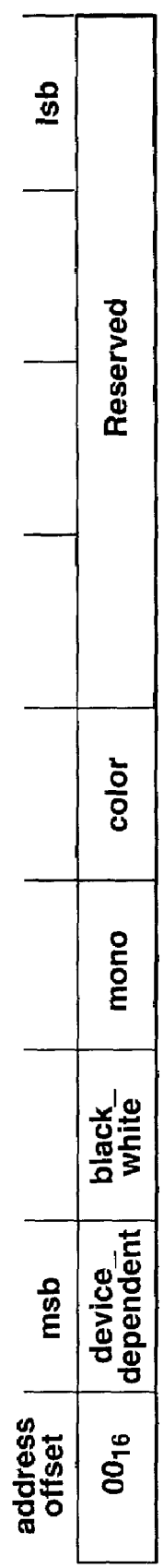
FIG. 34 illustrates another example of the contents of "mono_color" included in "Operation_mode2_parameters".

As another example of the print color information, "device_dependent", "black_white" (black-and-whiteprint), "mono" (monochrome (gray scale) print), and "color" (color print) are stored, as shown in FIGS. 34 and 35.

Figure 36:
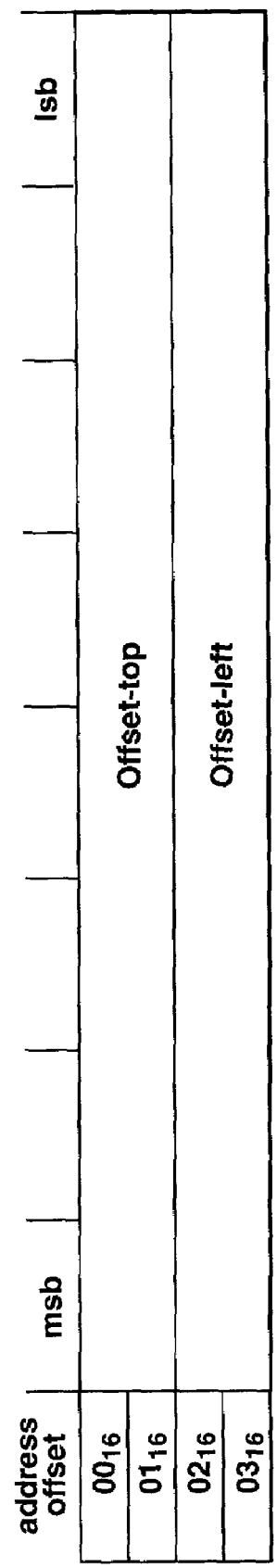
FIG. 36 illustrates the contents of "offset" included in "Operation_mode2_parameters".

In the print offset position information (offset), "Offset_top" and "Offset_left" are stored, as shown in FIGS. 36 and 37. "Offset_top" and "Offset_left" are expressed by hexadecimal numbers X000 to X999, and designate the offset position by 2 bytes using BCD (binary coded decimal). When X is hexadecimal 0, the print start position in the inward direction (plus) of the print sheet is indicated. When X is 8, the print start position in the outward direction (minus) of the print sheet is indicated. Two of the lower three digits express the integer and the remaining one digit expresses the decimal place. Thus, the position of the origin at the upper left part of the print sheet is designated within a range of 00.0 to 99.9 mm from the top and left ends of the sheet, thus designating the print start position. When the print offset position information is expressed by hexadecimal FFFF, "device_dependent" is indicated. When "subfunction" is "query" for inquiring the possible setting range of the operation mode 2 parameters, the possible maximum value is stored as the print offset position information.

Figure 38:
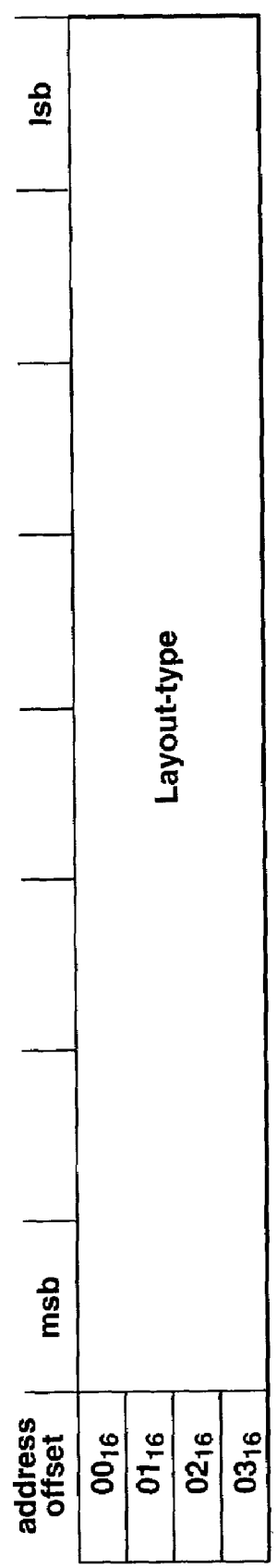
FIG. 38 illustrates the contents of "layout_type" included in "Operation_mode2_parameters".

In the layout setting information (Layout_type), "Layout_type" of 4 bytes is stored, as shown in FIGS. 38 and 39. This layout setting information indicates the type of layout as it is expressed by hexadecimal 00000000 to 0FFFFFFF. When it is expressed by FFFFFFFF, "device_dependent" is indicated.

As another example of the command as shown in FIG. 20, the data conversion section 13 may also output the above-described operation mode 1 and operation mode 2 as a single command to the printer device 5.

In this operation mode command, as shown in FIG. 40, hexadecimal 41 in opcode expresses that the command is an operation command. Following "subfunction", "status", "next_pic", "next_page" and "print_job_ID", "operation_mode_parameters" corresponding to the above-described operation mode 1 parameters is stored in operand [17] to operand[24], and "operation_mode_parameters" indicating print sheet type information, print sheet size information, print quality information, print color information, print offset position information and layout setting information is stored in operand [25] to operand [29] corresponding to the operation mode 2 (OPERATION MODE2) parameters included in the operation mode 2 command of FIG. 20. Such an operation command, in which the part of "operation_mode_parameters" is used for standard setting and the part of "operation_mode_optional_parameters" is used for extended setting, is processed between the data conversion section 13 and the data input section 31.

In "operation_mode_parameters", as described above, information of the same contents as those stored in the operation mode 1 command is stored.

In "operation_mode_optional_parameters", as shown in FIG. 41, "media_type" indicating the type of the print sheet for printing by the printer device 5, "media_size" indicating the dimension of the print sheet for printing by the printer device 5, "print_quality" indicating the print quality in printing by the printer device 5, and "mono_color" are stored, similarly to "Operation_mode2_parameters" of FIG. 22 stored in the operation mode 2 command of FIG. 20, and "rendering_intent" is further stored.

The printer device 5 has a data input section 31 for inputting static image data from the printer device 5, a ROM (read only memory) 32 in which a print control program is stored, a print engine 33 for carrying out printing on a print object, a RAM 34, and a CPU 35 for controlling each constituent portion, as shown in FIG. 4.

The data input section 31 is constituted by an interface circuit conformable to the IEEE 1394 standard and carries out signal processing in conformity with the IEEE 1394 standard with respect to the static image data included in the asynchronous packet 100 from the STB 3 in accordance with a control signal from the CPU 35.

Specifically, the data input section 31 carries out processing in the transaction layer, link layer and physical layer, with the serial bus managed in conformity with the IEEE 1394 standard. Thus, the data input section 31 outputs the static image data included in the asynchronous packet 100 to the CPU 35.

When the command packet having the operation mode 2 parameters stored therein is received from the data conversion section 13, the data input section 31 carries out processing to output various print setting information to the CPU 35.

When it is discriminated that "get" for obtaining the operation mode 2 parameters indicating the print setting information of the printer device 5 is stored as "subfunction", the data input section 31 recognizes the print setting to be obtained on the side of the STB 3, from the print sheet type information, print sheet size information, print quality information, print color information, print offset position information and layout setting information. Then, the data input section 31 sends the packet including the operation mode 2 parameters with respect to the recognized print setting as the response to the data conversion section 13.

When it is discriminated that "set" for setting the operation mode 2 parameters of the printer device 5 is stored as "subfunction", the data input section 31 recognizes the print setting to be set on the side of the STB 3, from the print sheet type information, print sheet size information, print quality information, print color information, print offset position information and layout setting information. Then, the data input section 31 outputs to the CPU 35 the information to the effect that the operation mode 2 parameters with respect to the recognized print setting should be set.

When it is discriminated that "query" for inquiring the possible setting range of the operation mode 2 parameters is stored as "subfunction", the data input section 31 recognizes the print setting inquired by the data conversion section 13, by checking the bit for each setting item of the print sheet type information, print sheet size information, print quality information, print color information, print offset position information and layout setting information. Then, the data input section 31 sends the asynchronous packet 100 including the possible setting value of the operation mode 2 parameters with respect to the print setting inquired by the data conversion section 13, as the response to the data conversion section 13.

Meanwhile, when the bit is established as "device_dependent" in the print sheet type information, print sheet size information, print quality information, print color information, print offset position information and layout setting information, the data input section 31 outputs the information to that effect to the CPU 35.

Moreover, when the data input section 31 is mechanically connected to the STB 3 through an optical cable or the like, the data input section 31 carries out connection setting with the data conversion section 13 of the STB 3 for transmission/reception of the asynchronous packet 100 with the printer 5.

The print engine 33 is constituted by a print object holding/driving mechanism, a printer head, and a printer head driving mechanism. The print engine 33 is controlled by the CPU 35 and prints the static image to the print object.

The CPU 35 generates control signals for controlling the data input section 31 and the print engine 33. In this case, the CPU 35 operates in accordance with the print control program stored in the ROM 32 and controls the contents of the RAM 34 as the work area.

When the print sheet type information (media_type), print sheet size information (Media_size), print quality information (Print_quality), print color information (Mono_color), print offset position information (offset) and layout setting information (Layout_type) are inputted from the data input section 31, the CPU 35 controls the print engine 33 in accordance with the various print settings.

When a print sheet of a type which is different from the print sheet type designated by the print sheet type information from the data input section 31 is prepared in the print engine 33, the CPU 35 controls the data input section 31 so as to generate a packet indicating that the print sheet type is different. In this case, when the print setting is different from the operation mode 2 parameters, the CPU 35 may carry out processing to indicate that the print setting is different, by using a display mechanism such as a lamp, not shown.

When a signal indicating that the bit is established as "device_dependent" in the print sheet type information, print sheet size information, print quality information, print color information, print offset position information and layout setting information is inputted from the data input section 31, the CPU 35 carries out printing so as to realize the optimum print sheet type, print sheet size, print quality, print offset position or layout position.

Figure 42:
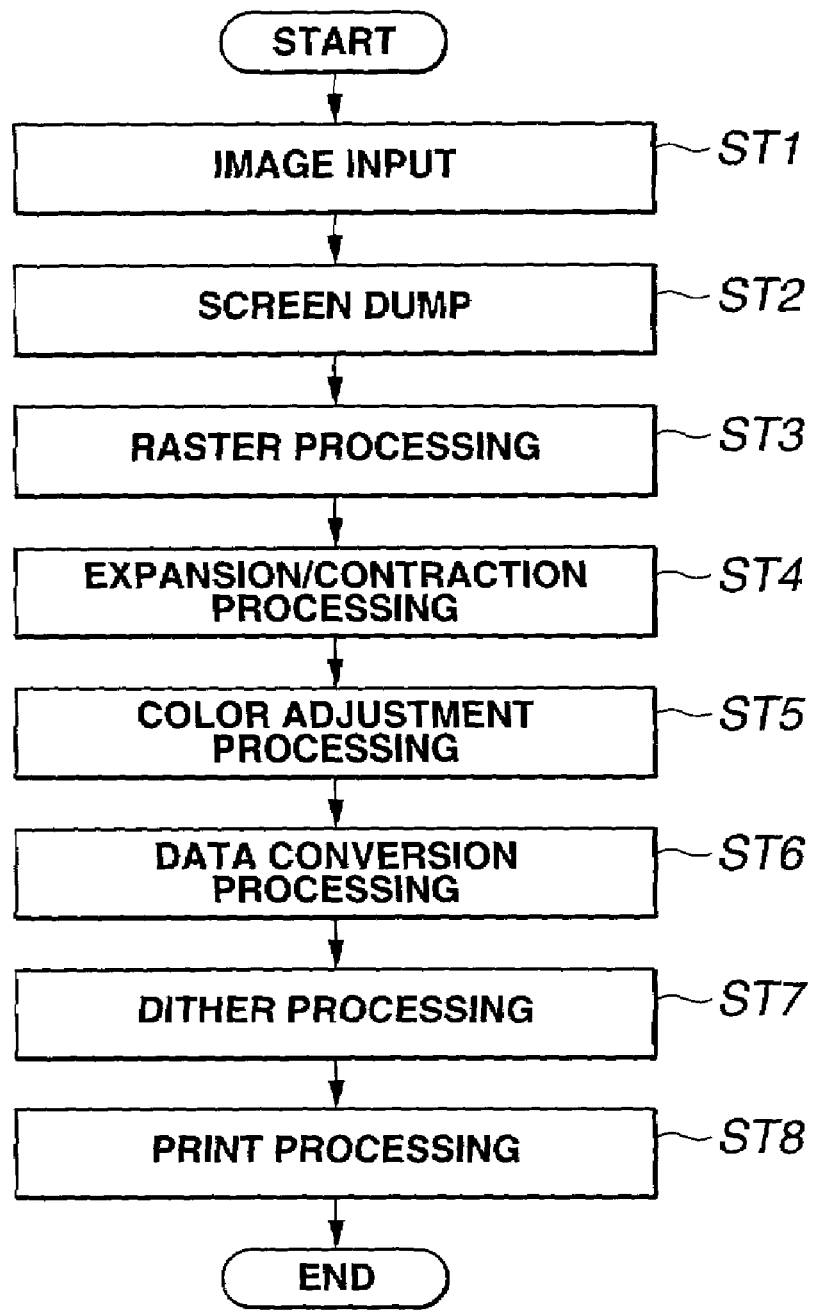
FIG. 42 is a flowchart for explaining the processing procedure of print processing carried out by the printer device constituting the image printing system to which the present invention is applied.

Such CPU 35 carries out processing as shown in the flowchart of FIG. 42 in accordance with the print control program.

In FIG. 42, first, at step ST1, the data input section 31 of the printer device 5 receives a data packet generated in conformity with the IEEE 1394 standard from the data conversion section 13. In this case, the data input section 31 carries out processing in the transaction layer, link layer and physical layer conformable to the IEEE 1394 standard, thereby extracting static image data, which is a YCC image consisting of luminance information Y and color-difference information Cr, Cb. When the operation mode 2 parameters are included in the command packet, the data input section 31 outputs each print setting to the CPU 35.

At the next step ST2, the CPU 35 carries out screen dump processing for printing the whole display on the screen of the television unit 4.

At the next step ST3, the CPU 35 carries out raster processing with respect to the static image data on which screen dump processing has been performed at step ST2. That is, the CPU 35 carries out processing to convert the static image data to a dot format for transfer to the print engine 33.

At the next step ST4, the CPU 35 carries out expansion/contraction processing in accordance with the print size information with respect to the static image data on which raster processing has been performed at step ST2. That is, the CPU 35 carries out processing to change the size of the static image at the time of printing within a range designated by the user.

At the next step ST5, the CPU 35 carries out color adjustment processing in accordance with the print color information with respect to the static image data on which expansion/contraction processing has been performed at step ST4, thereby changing the static image data consisting of the luminance information and color-difference information into print data made up of R (Red), G (Green) and B (Blue) or black-and-white print data.

The relational expression of a pixel value with the color space designated in the Y (ITU-R BT.601-4) format and a pixel value with the color space designated by RGB is described as follows.

$$Y'_{601YCC} = 0.299*R'_{RGB} + 0.587*G'_{RGB} + 0.144*B_{RGB}$$

$$Cr'_{601YCC} = 0.713*(R'_{RGB} - Y'_{601YCC})$$

$$= 0.500*R'_{RGB} - 0.419*G'_{RGB} - 0.081*B'_{RGB}$$

$$Cb'_{601YCC} = 0.564*(B'_{RGB} - Y'_{601YCC})$$

$$= -0.169*R'_{RGB} - 0.331*G'_{RGB} + 0.500*B'_{RGB}$$

As an 8-bit value, these can be expressed as follows.

$$Y'_{601YCC\_8bit}=(219.0*Y'_{601YCC})+16.0$$

$$Cb'_{601YCC\_8bit}=(224.0*Cb'_{601YCC})+128.0$$

$$Cr'_{601YCC\_8bit}=(240.0*Cr'_{601YCC})+128.0$$

This 8-bit value is transmitted as image data from the STB 3 to the printer device 5, and the 8-bit YCC value is converted to RGB at step ST5.

The relational expression of a pixel value with the color space designated in the Y (ITU-R BT.709-2) format and a pixel value with the color space designated by RGB is described as follows.

$$Y'_{709YCC}=0.2126*R'_{RGB}+0.7152*G'_{RGB}+0.0722*B'_{RGB}$$

$$Cb'_{709YCC}=0.5389*(B'_{RGB}-Y'_{709YCC})$$

$$Cr'_{709YCC}=0.6350*(R'_{RGB}-Y'_{709YCC})$$

As an 8-bit value, these can be expressed as follows.

$$Y'_{709YCC\_8bit}=(219.0*Y'_{709YCC})+16.0$$

$$Cb'_{709YCC\_8bit}=(224.0*Cb'_{709YCC})+128.0$$

$$Cr'_{709YCC\_8bit}=(224.0*Cr'_{709YCC})+128.0$$

This 8-bit value is transmitted as image data from the STB 3 to the printer device 5, and the 8-bit YCC value is converted to RGB at step ST5.

At the next step ST6, the CPU 35 carries out processing to convert the print data, which is color-adjusted and made up of RGB, to the colors of cyan, magenta and yellow, thereby determining the ratio of cyan, magenta and yellow at each dot. At step ST7, the CPU 35 carries out dither processing.

Finally, at step ST8, the CPU 35 outputs the print data obtained by dither processing to the print engine 33, thus carrying out print processing to drive the print engine 33 and draw the image onto the print object. In carrying out print processing, the CPU 35 sets the print sheet type, print sheet size, print quality, print color, print offset position and layout in accordance with the operation mode 2 parameters stored in the command packet from the data conversion section 13.

The processing of the CPU 23 when the printer device 5 prints the image data received by the STB 3 in the image printing system 1 constituted as described above will now be described with reference to FIG. 43.

Figure 43:
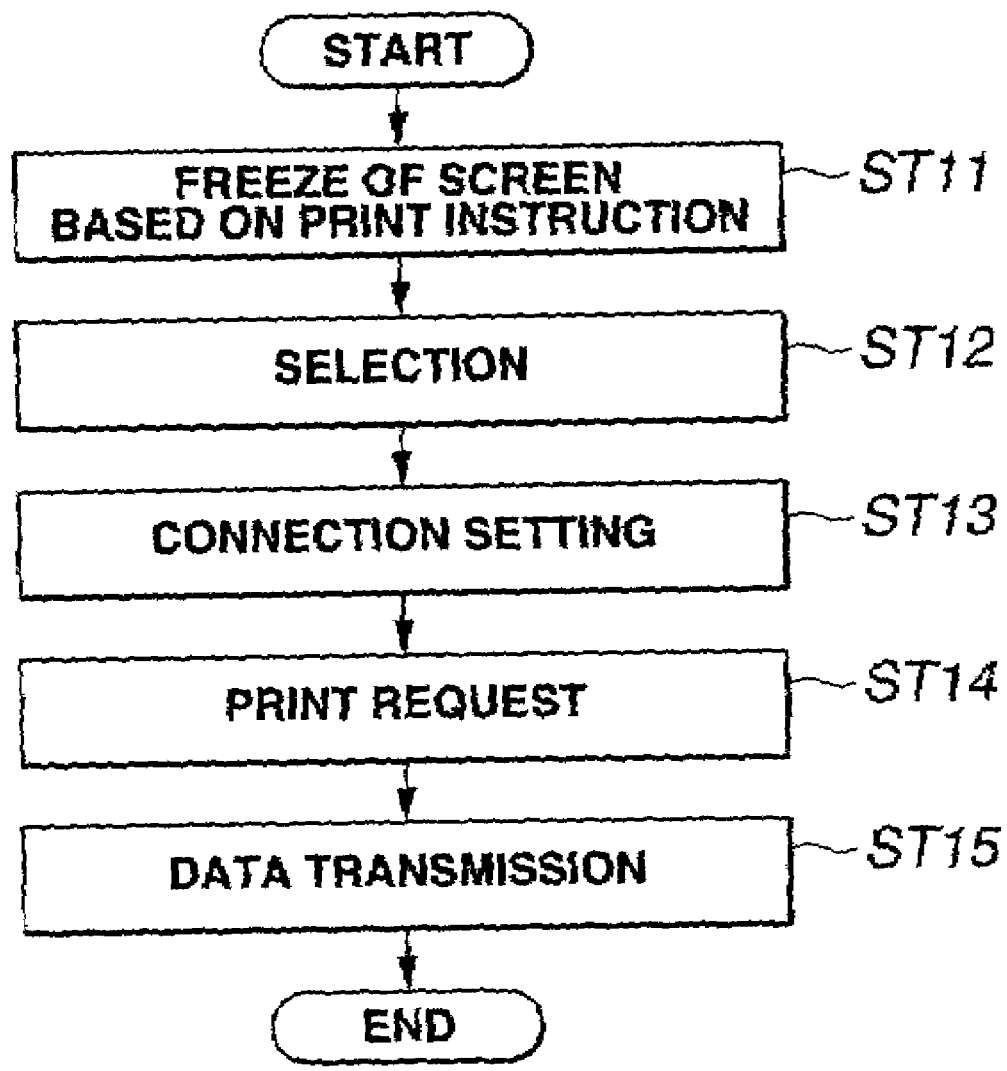
FIG. 43 is a flowchart for explaining the processing procedure of a CPU of the STB when an image displayed on a television unit is to be printed by the printer device.

In the flowchart of FIG. 43, first, at step ST11, as the user operates the operation button provided on the STB 3, an operation input signal to the effect that the dynamic image displayed on the television unit 4 is to be frozen is inputted to the CPU 23 of the STB 3. In response to this, the CPU 23 controls the display control section 19 to stop the output of the dynamic image data from the NTSC processing section 18 to the television unit 4, thus causing the television unit 4 to display a static image.

At the next step ST12, when an operation input signal to the effect that the static image data of a frame unit frozen at step ST11 and displayed on the television unit 4 is to be selected and printed by the printer device 5 is inputted from the operation input section 21, the CPU 23 controls the display control section 19, the MPEG processing section 16, and the demultiplexer section 14 to read the static image data of the frame unit stored in the display memory 20 into the image memory 15. Thus, the CPU 23 stores the static image data consisting of luminance information Y and color-difference information Cr, Cb into the image memory 15.

At the next step ST13, the CPU 23 controls the data conversion section 13 so as to carry out connection setting between the STB 3 and the printer device 5 in conformity with the IEEE 1394 standard. Specifically, when a control signal to the effect that connection setting is to be carried out is inputted from the CPU 23, the data conversion section 13 generates a command packet and recognizes the plug with the data input section 31. In this case, the data conversion section 13 transmits to the data input section 31 of the printer device 5 a command packet having stored therein information indicating the transmission side. The data input section 31 of the printer device 5 recognizes the information indicating the transmission side plug and transmits to the data conversion section 13 a command packet having stored therein information indicating the receiving side plug to be asynchronously connected. Thus, the data conversion section 13 recognizes the information indicating the receiving side plug of the data input section 31 of the printer device 5, and the data input section 31 recognizes the information indicating the transmission side plug of the data conversion section 13 of the STB 3.

At the next step ST14, in accordance with an operation input signal, the CPU 23 generates a command packet designating the print sheet type, print sheet size, print quality, print color, print offset position, or layout setting at the time of printing the static image by the printer device 5, and outputs the command packet to the data input section 31. The CPU 23 also generates a command packet including a capture command and outputs the command packet to the data input section 31. Thus, the CPU 23 makes print request.

At the next step ST15, the CPU 23 controls the demultiplexer section 14 and the data conversion section 13 to output to the printer device 5 the static image data to be printed by the printer device 5, thereby generating a data packet including the static image data stored in the image memory 15 and transmitting the data packet to the printer device 5.

As the printer device 5 has received a plurality of data packets including the information indicating the receiving side plug and thus determines that it has received all the data of the static image data, the printer device 5 causes the CPU 35 to carry out the processing shown in FIG. 42, thereby printing the image represented by the static image data in accordance with the designated print size or the like.

An example of transmitting/receiving the asynchronous packet 100 between the STB 3 and the printer device 5 and printing the static image data by the printer 5 will now be described with reference to FIG. 44.

Figure 44:
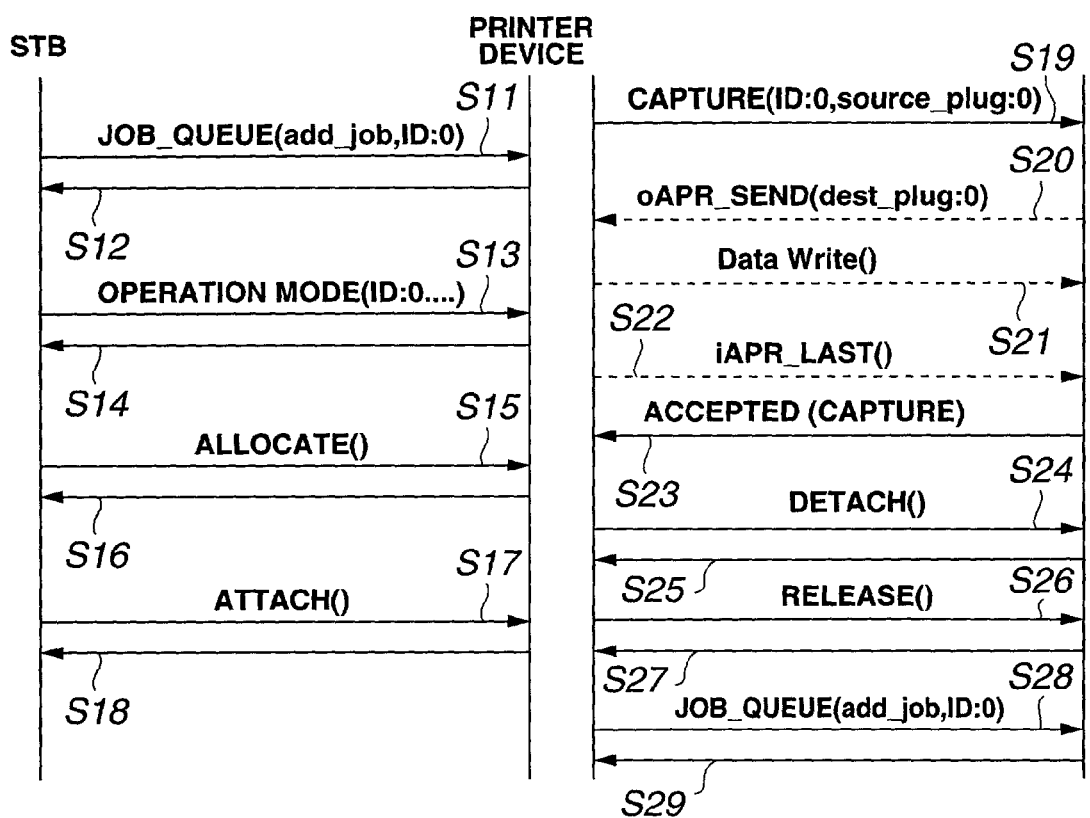
FIG. 44 illustrates the processing for transmitting/receiving an asynchronous packet between the STB and the printer device and printing static image data by the printer device.

In FIG. 44, before starting print processing, the data conversion section 13 transmits a command packet (JOB_QUEUE) S11 to the printer device 5 so as to indicate that there is a job of printing one static image, and receives a response packet S12 for this command packet.

The data conversion section 13 transmits to the printer device 5 a command packet S13 which designates the operation mode indicating the type and size of the print sheet, print quality, color (monochrome/color) for print processing and printing position at the time of printing by the printer device 5, or which designates the operation mode 2 parameters including the print sheet type information, print sheet size information, print quality information, print color information, print offset position information and layout setting information, and then receives a response packet S14 for that command packet. In this case, on the basis of the response from the printer device 5, the data conversion section 13 discriminates whether the printer device 5 is capable of accepting the operation mode 2 parameters or not.

Then, the data conversion section 13 carries out plug setting for transmitting the static image data to the data input section 31. Specifically, the data conversion section 13 first transmits a command packet S15 having stored therein an ALLOCATE command to the data input section 31 so as to carry out setting of the receiving side plug, and then receives a response packet S16 for that command.

The data conversion section 13 also transmits a command packet S17 having stored therein an ATTACH command indicating that the plug for receiving the data packet including the static image data to be printed by the printer device 5 should be set and transmission/reception of the data packet should be carried out, and then receives a response packet S18 for that command packet.

Then, the data conversion section 13 transmits a command packet S19 including a capture command. In the command packet S19, information indicating the transmission side plug on the side of the data conversion section 13 (source_plug) is stored. Thus, the data input section 31 recognizes the transmission side plug of the data conversion section 13.

The data input section 31 transmits a packet S20 including information setting oAPR (output Asynchronous Port Register) to the data conversion section 13. In the packet S20, information indicating the receiving side plug of the data input section 31 (dest_plug) is stored. In this case, the data input section 31 transmits the packet S20 including the information indicating the transmission side plug recognized by receiving the command packet S19. Then, the data conversion section 13 recognizes the receiving side plug of the data input section 31.

The data conversion section 13 transmits to the data input section 31 a data packet S21 having the static image data of a YCC image stored in the data portion 102. In this case, the data conversion section 13 divides the static image data into predetermined data quantities and transmits a plurality of data packets S21.

Then, the data conversion section 13 transmits to the data input section 31 a response packet S22 including information related to iAPR (input Asynchronous Port Register) of a flow control register of the transmission side plug.

The data input section 31 transmits to the data conversion section 13 a command packet S23 indicating that the capture command has been accepted.

In response to this, the data conversion section 13 transmits a command packet S24 including a DETACH command indicating that the connection with the printer device 5 should be canceled, and receives a response packet S25 from the data input section 31.

The data conversion section 13 transmits a command packet S25 including a RELEASE command to the data input section 31 of the printer device 5, and receives a response packet S26 from the data input section 31.

Then, the data conversion section 13 transmits to the data input section 31 a command packet (JOB_QUEUE) S28 indicating that the sequence indicating the job of printing the static image is completed, and receives a response packet S29 for that command packet.

Thus, with such image printing system 1, even when the STB 3 and the printer device 5 are connected with each other in conformity with the IEEE 1394 standard, the asynchronous packet 100 including the print sheet type information, print sheet size information, print quality information, print color information, print offset position information and layout setting information is transmitted to the printer device 5, and detailed print setting can be carried out in response to the request from the user.

Specifically, with the image printing system 1, the user can generate an operation input signal requesting the print quality, print speed or the like, and can cause the printer device 5 to carry out print processing in response to the operation input signal.

Also, with the image printing system 1, even in the case where a print sheet which requires precise designation of the printing position for printing at the accurate position such as a seal with a slit formed thereon is used, a command packet including the print sheet type information and print offset position information or the like is transmitted from the data conversion section 13 to the data input section 31, and accurate print processing can be carried out by the printer device 5.

Moreover, with the image printing system 1, the print offset position information enables designation of the print start position by designating the position of the origin at the upper left part of the print sheet within a range of 00.0 to 99.9 mm from the top and left ends of the sheet. Therefore, minute control of the print start position is made possible.

The printing position within the effective print range is designated by the layout setting information or the like. The effective print range might be deviated in some cases due to the difference in the sheet feeding system such as hand-feeding or cassette-feeding. Even in the case where the mechanical accuracy for sheet feeding is thus changed by the use state of the printer device 5 dependent on the user, the aged deterioration of the printer device 5, the thickness of the print sheet, the surface state of the print sheet, or the size of the print sheet, the print start position can be minutely set in accordance with the print offset position information and printing can be carried out at the accurate position.

Also, with the image printing system 1, optimum printing can be carried out in accordance with the type of the sheet on the side of the STB 3. Specifically, with the image printing system 1, the print speed can be adjusted in accordance with the print sheet. For example, when a seal is used as the print sheet, printing is carried out at a lower speed than when a normal sheet is used.

Moreover, with the image printing system 1, even in the case where the printer device 5 is set in the state which is different from the request from the user, the CPU 35 of the printer device 5 carries out control so as to transmit a packet command to that effect from the data input section 31 to the data conversion section 13, thereby notifying the user.

In the above description of the image printing system 1, the asynchronous packet 100 including non-compressed static image data is transmitted from the STB 3 to the printer device 5. However, the static image data may be compressed in accordance with the JPEG system by the MPEG processing section 16 and the asynchronous packet 100 including the compressed static image data may be transmitted and received. With such image printing system 1, since the quantity of data to be transmitted can be reduced, data transfer and print processing at a higher speed can be realized.

Also, in the above description of the image printing system 1, the data conversion section 13 and the data input section 31, which are interface circuits conformable to the IEEE 1394 standard, are provided in the STB 3 and the printer device 5, respectively. However, other interface circuits such as USB may also be used. That is, with the image printing system 1 including the STB 3 and the printer device 5 which have USB, packets in the digital system can be transmitted/received between the STB 3 and the printer device 5 and a precise image can be printed by the printer device 5.

Meanwhile, the FCP and AV/C protocol prescribe information indicating how many images should be printed on one page (number_of_pics) in the operation mode 1 command for print setting.

For example, in the case of producing an index of a CD album, a list of music tune titles with an image size contracted to 1/4 is to be printed in a left half portion of the sheet and an image with an image size contracted to 1/4 is to be printed in a right half portion of the sheet, as shown in FIG. 45. In this case, such printing is made possible by setting allocation of four images on one sheet in accordance with "number_of_pics" of the operation mode 1 command and then alternately transmitting the title list and the image to the printer device 5 in accordance with the capture command.

Figure 46:
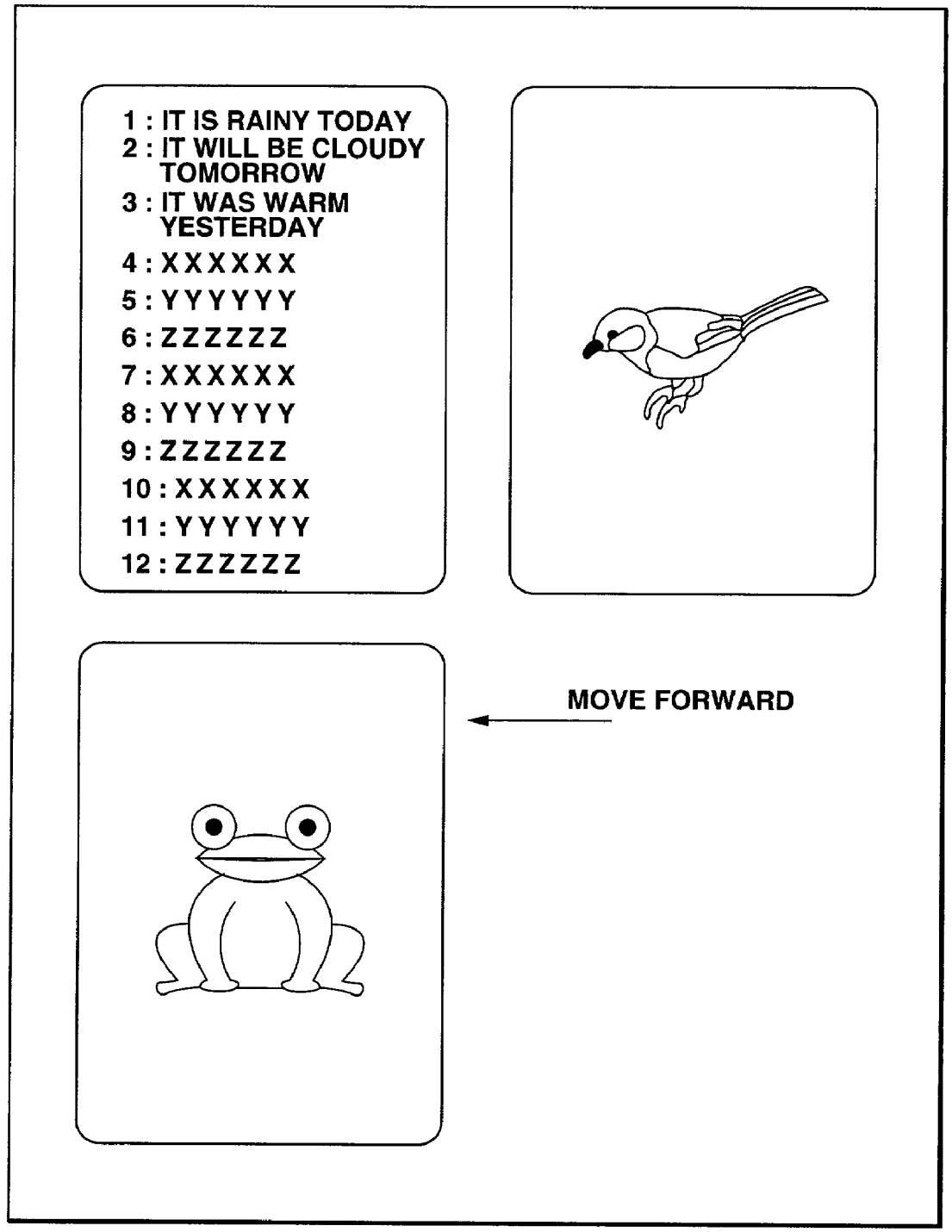
FIG. 46 illustrates an example of print in which a blank area cannot be produced in the case where four images are allocated on one print sheet.

However, if a certain album does not have a title list, the title list of that album cannot be transmitted to printer device 5. Then, as shown in FIG. 46, the image of that album is moved forward and printed in the left half portion of the sheet, where the title list should be printed.

Thus, the STB 3 and the printer device 5 carry out the following setting so as to provide a blank area in an arbitrary print area when printing a plurality of images on one page, as shown in FIG. 47.

To provide a blank area, the image type (image_format_specifier) is set (e.g., sRGB row) in the capture command, but the quantity of data to be transmitted (data_size), the number of pixels in the X-direction (image_size_x) and the number of pixels in the Y-direction (image_size_y) are all set to 0, as shown in FIG. 48. Specifically, in the case of producing a blank area, the STB 3 sets a capture command as shown in FIG. 48 in accordance with the operation input from the user and transmits the capture command to the printer device 5. Then, the printer device 5, having received the capture command thus set, makes a blank in the corresponding area on the basis of the setting and continues printing from the next area. In this case, the image type (image_format_specifier) may be "sRGB row" as shown in FIG. 49, other than "Don't Care" as shown in FIG. 48.

As another example, the format type of "Null Object" is added to the image of the image type (image_format_specifier) set by the capture command, as shown in FIG. 50. "Unit Plug defined" newly shown in FIG. 50 is stored in the case of transmitting an isochronous packet with an isochronous plug designated as "source_plug" of the capture command. "Don't care" means that the transmission side does not care the image type. That is, the transmission side does not care about the contents of the transmitted object, i.e., the image type of the captured image. In this case, even when certain processing is required on the printer side, such processing is handled by the AV/C command, and default setting is carried out on the printer side, if necessary, or such processing is handled by other commands. Thus, in the case of providing a blank area as in the present invention, though it is necessary to provide an area with a designated size, substantially no image contents exist. Therefore, it means that the image size and the number of pixels in the X-direction and Y-direction are zero, and one capture can be processed as a blank.

In the case of producing a blank area, the STB 3 sets "Null Object" as the image type (image_format_specifier) of the capture command in accordance with the operation input from the user, and transmits the capture command to the printer device 5. Then, the printer device 5, having received the capture command thus set, makes a blank in the corresponding area on the basis of the setting and continues printing from the next area.

As still another example, skip information for producing a blank area is stored in "subfunction" of the capture command. For example, information expressed by hexadecimal 02 and referred to as "skip" as shown in FIG. 51 is stored. In the case of producing a blank area, the STB 3 stores hexadecimal 02 into "subfunction" of the capture command in accordance with the operation input from the user and transmits the capture command to the printer device 5. Then, the printer device 5, having received the capture command thus set, makes a blank in the corresponding area on the basis of the setting and continues printing from the next area. The information set in "subfunction" may be, for example, information expressed by hexadecimal 01 and referred to as "receive", information expressed by hexadecimal 03 and referred to as "resume", and information expressed by hexadecimal 04 and referred to as "query", as well as the above-mentioned information of hexadecimal 02. The information "receive" is stored in "subfunction" when giving an image data reception instruction by the capture command. In the case of transmitting the image data, the STB 3 stores "receiver" in "subfunction" of the capture command and gives an image data reception instruction to the printer device 5. The information "resume" is stored in "subfunction" when confirming the quantity of image data already transmitted to the printer device 5 in the case where bus reset is carried out on the IEEE 1394 interface. The information "query" is stored in "subfunction" when wishing to know the possible setting range of the operation mode 2 parameters of the printer device 5.

As described above, with the image printing system 1, in the case of printing a plurality of images on one page, a blank area can be provided in a part of the page. Therefore, with the image printing system 1, a contracted image can be allocated at an arbitrary position on the print sheet. Also, in the case where only a small number of capture commands are transmitted with respect to the number of allocated images, it can be easily determined whether a blank area should be provided in the corresponding area or there is an error.

INDUSTRIAL APPLICABILITY

With the image processing device and method according to the present invention, since print control information including information indicating the number of print images on one page of a print sheet and information indicating inclusion of a blank image into the image to be printed on the print sheet is transmitted, a blank area can be provided in a part of the sheet in the case of printing a plurality of images on one page. Thus, according to the present invention, a contracted image can be allocated at an arbitrary position on the print sheet.

With the printing device and method according to the present invention, since printing is carried out using print control information including information indicating the number of print images on one page of a print sheet and information indicating inclusion of a blank image into the image to be printed on the print sheet, a blank area can be provided in a part of the sheet in the case of printing a plurality of images on one page. Thus, according to the present invention, a contracted image can be allocated at an arbitrary position on the print sheet.

With the image printing system and method according to the present invention, since print control information including information indicating the number of print images on one page of a print sheet and information indicating inclusion of a blank image into the image to be printed on the print sheet is transmitted, a blank area can be provided in a part of the sheet in the case of printing a plurality of images on one page. Thus, according to the present invention, a contracted image can be allocated at an arbitrary position on the print sheet.

With the recording medium according to the present invention, since print control information including information indicating the number of print images on one page of a print sheet and information indicating inclusion of a blank image into the image to be printed on the print sheet is transmitted, a blank area can be provided in a part of the sheet in the case of printing a plurality of images on one page. Thus, according to the present invention, a contracted image can be allocated at an arbitrary position on the print sheet.

With the recording medium according to the present invention, since printing is carried out using print control information including information indicating the number of print images on one page of a print sheet and information indicating inclusion of a blank image into the image to be printed on the print sheet, a blank area can be provided in a part of the sheet in the case of printing a plurality of images on one page. Thus, according to the present invention, a contracted image can be allocated at an arbitrary position on the print sheet.

The invention claimed is:

1. An image processing method comprising the steps of:
performing image processing on an image signal inputted from outside and thus generating image data;
generating a command instructing start of a print job with respect to the generated image data, a command including information indicating the number of print images on one page of a print sheet, and a capture command including print control information with respect to the generated image data;
including the generated image data and the respective commands into a packet conformable to the IEEE 1394 standard and outputting the packet to a printing device; and
wherein in the case where a blank image is included in an image area to be printed on the print sheet, setting a quantity of image data and a number of pixels in an X-direction and a Y-direction at zero as print control information with respect to the blank image and setting the capture command at a value indicating that the image type of the image data is not considered.

2. A printing method comprising the steps of:
performing image processing on an image signal inputted from outside and thus generating image data;
receiving input of the image data included in a packet conformable to the IEEE 1394 standard, a command instructing start of a print job with respect to the image data, a command including information indicating the number of print images on one page of a print sheet, and a capture command including print control information with respect to the generated image data; and
setting an image area to be printed on the print sheet as a blank area in the case where the capture command is inputted which sets a quantity of image data and a number of pixels in an X-direction and a Y-direction at zero as print control information and setting the capture command at a value indicating that the image type of the image data is not considered.

* * * * *